United States Patent
Choi et al.

(10) Patent No.: US 11,982,733 B2
(45) Date of Patent: May 14, 2024

(54) ELECTRONIC DEVICE FOR DETERMINING POSITION OF EXTERNAL ELECTRONIC DEVICE AND METHOD THEREOF

(71) Applicant: Samsung Electronics Co., Ltd., Gyeonggi-do (KR)

(72) Inventors: Sehwan Choi, Gyeonggi-do (KR); Sukgi Hong, Gyeonggi-do (KR); Hyunchul Kim, Gyeonggi-do (KR); Yi Yang, Gyeonggi-do (KR); Sungjun Lim, Gyeonggi-do (KR); Jungsik Park, Gyeonggi-do (KR); Hyunju Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 909 days.

(21) Appl. No.: 16/980,735

(22) PCT Filed: Sep. 7, 2020

(86) PCT No.: PCT/KR2020/012020
§ 371 (c)(1),
(2) Date: Sep. 14, 2020

(87) PCT Pub. No.: WO2021/049827
PCT Pub. Date: Mar. 18, 2021

(65) Prior Publication Data
US 2023/0152440 A1 May 18, 2023

(30) Foreign Application Priority Data
Sep. 10, 2019 (KR) .................. 10-2019-0112393

(51) Int. Cl.
*H04B 7/04* (2017.01)
*G01S 13/76* (2006.01)
(Continued)

(52) U.S. Cl.
CPC ........... *G01S 13/765* (2013.01); *H01Q 21/30* (2013.01)

(58) Field of Classification Search
CPC ......... G01S 13/765; G01S 5/06; H01Q 21/30; H01Q 21/061; H04W 4/02; H04W 64/00;
(Continued)

(56) References Cited

U.S. PATENT DOCUMENTS 7,711,375 B2   5/2010   Liu
8,290,551 B2   10/2012  Landesman et al.
(Continued)

FOREIGN PATENT DOCUMENTS

JP   2013-152112   8/2013
JP   2015-175700   10/2015
(Continued)

OTHER PUBLICATIONS

International Search Report dated Dec. 24, 2020 issued in counterpart application No. PCT/KR2020/012020, 6 pages.

*Primary Examiner* — Andrew Wendell
(74) *Attorney, Agent, or Firm* — The Farrell Law Firm, P.C.

(57) ABSTRACT

A portable electronic device is disclosed that includes a communication circuit electrically connected to a first antenna or a third antenna and electrically connected to a second antenna, at least one processor, and a memory. The memory may store one or more instructions that, when executed, cause the at least one processor to receive a first signal including first data from an external electronic device using the first antenna and the second antenna, receive a second signal including second data from the external electronic device using the third antenna, and determine a position of the external electronic device based on a phase difference of the first signal, time information of the first (Continued)

data, and time information of the second data. In addition to the above, various embodiments understood through the present disclosure are possible.

19 Claims, 19 Drawing Sheets

(51) Int. Cl.
*H01Q 21/30* (2006.01)
*H04B 1/00* (2006.01)

(58) Field of Classification Search
CPC ....... H04W 4/029; H04B 1/0064; H04B 7/02; H04B 7/04; H04B 7/0404; H04B 17/253; H04B 17/27
See application file for complete search history.

(56) References Cited

U.S. PATENT DOCUMENTS

| | | | |
|---|---|---|---|
| 8,624,774 B2 | 1/2014 | De Rosa | |
| 10,018,702 B2 | 7/2018 | Schrabler et al. | |
| 10,206,122 B2 | 2/2019 | Wang et al. | |
| 10,299,104 B2 | 5/2019 | Lim et al. | |
| 10,749,274 B2 * | 8/2020 | Oh | H01Q 1/243 |
| 10,969,457 B2 | 4/2021 | Jamin et al. | |
| 11,815,611 B2 * | 11/2023 | Baker | G01S 3/48 |
| 2002/0089966 A1 * | 7/2002 | Bolgiano | H04B 7/0671 |
| | | | 370/441 |
| 2004/0029558 A1 | 2/2004 | Liu | |
| 2010/0034133 A1 | 2/2010 | Marom et al. | |
| 2011/0143673 A1 | 6/2011 | Landesman et al. | |
| 2011/0228820 A1 | 9/2011 | De Rosa | |
| 2016/0097847 A1 * | 4/2016 | Loesch | G01S 13/931 |
| | | | 342/156 |
| 2016/0209489 A1 | 7/2016 | Schrabler et al. | |
| 2016/0366548 A1 | 12/2016 | Wang et al. | |
| 2018/0063694 A1 | 3/2018 | Lim et al. | |
| 2018/0372832 A1 | 12/2018 | Ko et al. | |
| 2019/0052340 A1 | 2/2019 | Yuan | |
| 2019/0170847 A1 | 6/2019 | Jamin et al. | |
| 2019/0200357 A1 * | 6/2019 | Yokote | H01Q 1/52 |
| 2019/0317177 A1 * | 10/2019 | Ertan | G01S 13/75 |
| 2020/0252101 A1 * | 8/2020 | McLaughlin | G01S 5/12 |
| 2020/0337162 A1 * | 10/2020 | Perkins | G04G 17/04 |
| 2021/0076350 A1 | 3/2021 | Yang et al. | |
| 2022/0043990 A1 * | 2/2022 | Pandey | G06K 7/10039 |

FOREIGN PATENT DOCUMENTS

| | | |
|---|---|---|
| KR | 10-1349418 | 1/2014 |
| KR | 10-2016-0050083 | 5/2016 |
| KR | 10-1952765 | 2/2019 |
| KR | 1020210030180 | 3/2021 |

* cited by examiner

ELECTRONIC DEVICE FOR DETERMINING POSITION OF EXTERNAL ELECTRONIC DEVICE AND METHOD THEREOF

PRIORITY

This application is a National Phase Entry of PCT International Application No. PCT/KR2020/012020 which was filed on Sep. 7, 2020, and claims priority to Korean Patent Application No. 10-2019-0112393, which was filed on Sep. 10, 2019, the entire contents of each of which is incorporated herein by reference.

TECHNICAL FIELD

Various embodiments disclosed in the present disclosure relate to an electronic device for determining the position of an external electronic device and a method thereof.

BACKGROUND ART

Various position-based services are provided. The position-based service may provide a more improved service as the position of a user is more accurately determined. For example, the position of an electronic device may be determined based on a global navigation satellite system (GNSS). In this case, the position of the electronic device may be determined with an error of about 10 meters. However, other positioning methods may be required to determine the electronic device more accurately. In addition, positioning based on satellite signals may not be performed indoors.

For more accurate positioning, various methods may be used. For example, the electronic device may determine the position of an external electronic device by transmitting and receiving signals to and from the external electronic device. The electronic device may receive signals from an external electronic device using a plurality of antennas, and may determine the position of the external electronic device based on the phase difference between the received signals received by the respective antennas. The electronic device may receive a signal including transmission time information or reception time information from the external electronic device, and may determine a distance between the electronic device and the external electronic device based on the received signal.

DISCLOSURE OF THE INVENTION

Technical Problem

For example, the electronic device may be a portable electronic device. In general, the portable electronic device may have a limited size. In addition, the portable electronic device may have limited functionality due to various constraints. For example, the portable electronic device may include a limited number of antennas. Due to limited functionality, the portable electronic device may determine the position of the external electronic device only for limited coverage. For example, in order to increase the coverage, it may be contemplated to increase the number of antennas of the portable electronic device. In this case, the production cost and/or size of the portable electronic device may be increased.

For the portable electronic device, the user may hold the portable electronic device in various ways. In this case, as the orientation of the portable electronic device is changed, information required to determine the position of the external electronic device may be insufficient.

Technical Solution

Various respective aspects and features of the invention are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

A portable electronic device according to an embodiment of the present disclosure includes a communication circuit electrically connected to a first antenna or a third antenna and electrically connected to a second antenna, at least one processor operatively connected with the communication circuit, and a memory operatively connected with the at least one processor, wherein the memory may store one or more instructions that, when executed, cause the at least one processor to receive a first signal including first data from an external electronic device using the first antenna and the second antenna, receive a second signal including second data from the external electronic device using the third antenna, and determine a position of the external electronic device based on a phase difference of the first signal, time information of the first data, and time information of the second data.

Furthermore, a method of determining a position of an external electronic device by a portable electronic device according to an embodiment of the present disclosure includes receiving a first signal including first data from the external electronic device using a first antenna and a second antenna connected to a communication circuit of the portable electronic device, switching the connection of the first antenna such that the communication circuit is connected to the third antenna, receiving a second signal including second data from the external electronic device using the third antenna, and determining the position of the external electronic device based on a phase difference of the first signal, time information of the first data, and time information of the second data, wherein the communication circuit may be electrically connected to the first antenna or the third antenna and electrically connected to the second antenna.

Furthermore, a portable electronic device according to an embodiment of the present disclosure includes a communication circuit electrically connected to a first antenna and electrically connected to a second antenna or a third antenna, at least one processor operatively connected with the communication circuit, and a memory operatively connected with the at least one processor, wherein the memory may store one or more instructions that, when executed, cause the at least one processor to receive a first signal including first data from an external electronic device using the first antenna and the second antenna, receive a second signal including second data from the external electronic device using the first antenna and the second antenna, and determine a position of the external electronic device based on a phase difference of the first signal, time information of the first data, a phase difference of the second signal, and time information of the second data.

It is an aim of certain embodiments of the invention to solve, mitigate or obviate, at least partly, at least one of the problems and/or disadvantages associated with the prior art. Certain embodiments aim to provide at least one of the advantages described below.

Advantageous Effects

According to various embodiments disclosed in the present disclosure, an electronic device may determine the position of an external electronic device.

According to various embodiments disclosed in the present disclosure, an electronic device may improve accuracy in determining a position by using various antennas.

According to various embodiments disclosed in the present disclosure, an electronic device may improve a range of determining a position by using various antennas.

Besides, various effects may be provided that are directly or indirectly understood through the disclosure.

BRIEF DESCRIPTION OF THE DRAWINGS

With respect to the description of the drawings, the same or similar reference numerals may be used for the same or similar elements.

MODE FOR CARRYING OUT THE INVENTION

Figure 1:
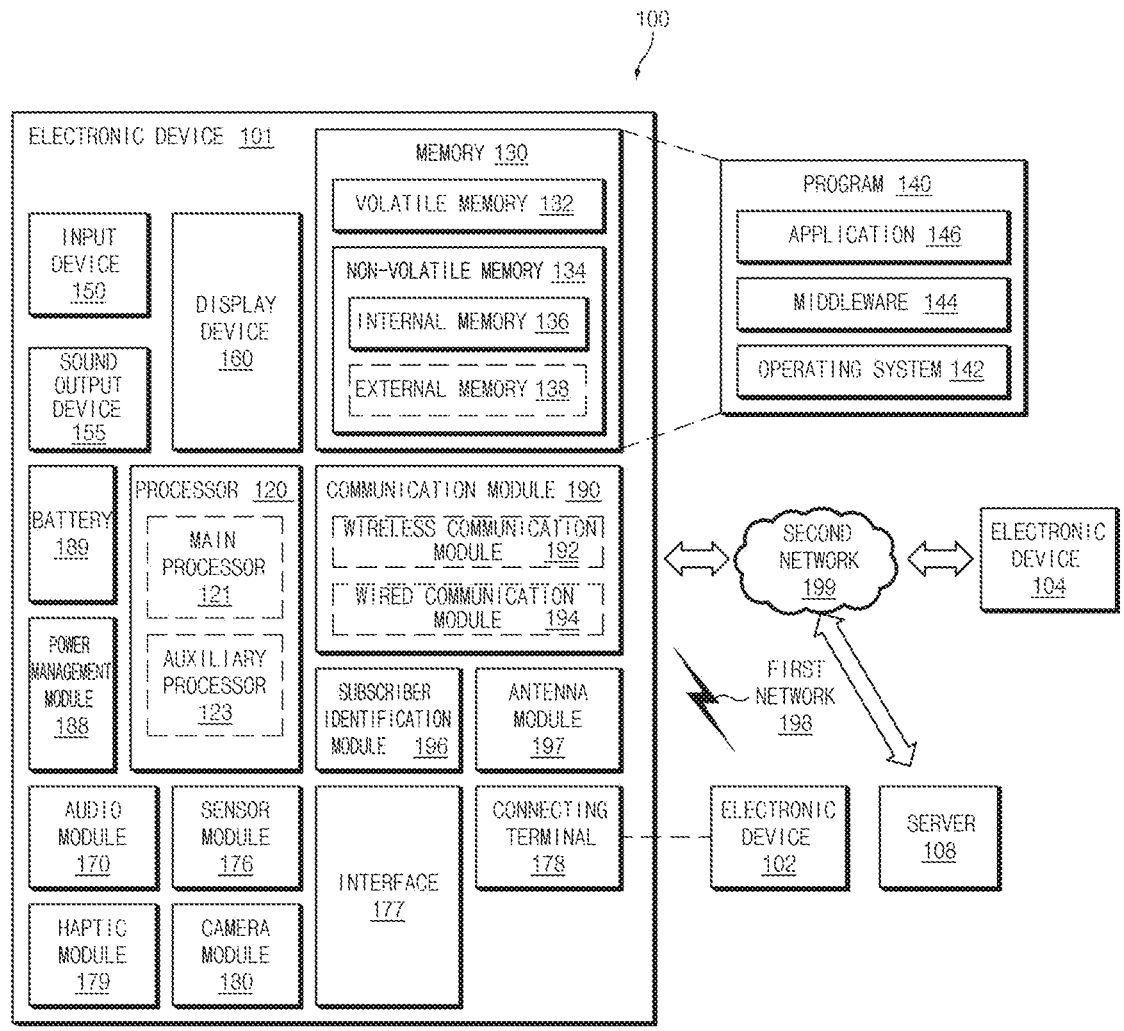
FIG. 1 illustrates a block diagram of an electronic device in a network according to various embodiments.

Hereinafter, various embodiments disclosed in the disclosure will be described with reference to the accompanying drawings. It should be appreciated that embodiments and the terms used therein are not intended to limit the technologies set forth herein to particular embodiments and include various modifications, equivalents, and/or replacements for a corresponding embodiment.

The scope of protection is defined by the appended independent claims. Further features are specified by the appended dependent claims. Example implementations can be realized comprising one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected component of any one example described in this disclosure may be combined with one or more selected component of any other one or more example described in this disclosure, or alternatively may be combined with features of an appended independent claim to form a further alternative example.

Further example implementations can be realized comprising one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that the skilled person would directly and unambiguously recognize as being not, as such, indispensable for the function of the present technique in the light of a technical problem discernible from this disclosure. The skilled person would recognize that replacement or removal of such an omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
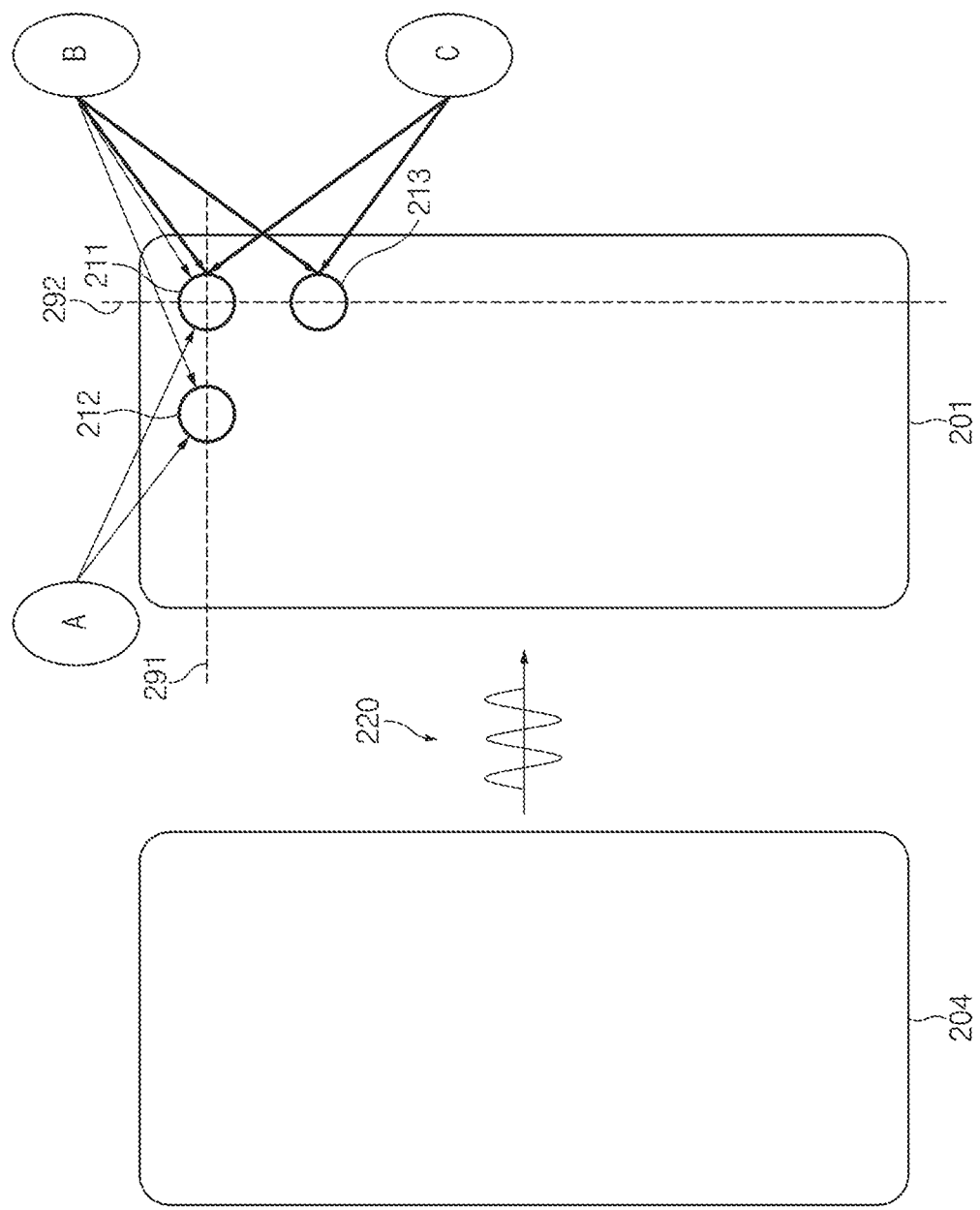
FIG. 2 illustrates an antenna arrangement for positioning of an electronic device according to an embodiment.

FIG. 2 illustrates an antenna arrangement for positioning of an electronic device 201 according to an embodiment.

Referring to FIG. 2, the electronic device 201 (e.g., the electronic device 101 of FIG. 1) may determine the position of an external electronic device 204 (e.g., the electronic device 104 of FIG. 1) using at least three antennas. For example, the external electronic device 204 may be a device (e.g., a tag), which performs any wireless communication, such as a mobile phone, a tablet, a wearable device, a home appliance, an Internet-of-Things (IoT) device, and the like. For example, the electronic device 201 may determine the position of the external electronic device 204 (e.g., a position relative to the electronic device 201) using a first antenna 211, a second antenna 212, and a third antenna 213.

The electronic device 201 may identify the direction of the external electronic device 204 (e.g., the direction relative to the electronic device 201) using an angle of arrival (AoA) of a signal 220 from the external electronic device 204. The electronic device 201 may receive the signal 220 from the external electronic device 204 using the first antenna 211 and the second antenna 212, and may identify the angle of arrival of the signal 220 from the external electronic device 204 (e.g., the direction of the external electronic device 204) based on the phase difference between the signal received by the first antenna 211 and the signal received by the second antenna 212. The electronic device 201 may identify the angle of arrival based on the distance between the first antenna 211 and the second antenna 212 and the phase difference. In this case, for example, the distance between the first antenna 211 and the second antenna 212 may be set to a specified first distance (e.g., about half a wavelength of the signal 220), for performing beamforming on the signal 220.

The distance between the electronic device 201 and the external electronic device 204 may be identified using the signal 220 from the external electronic device 204. The signal 220 from the external electronic device 204 may include reception time information and/or transmission time information. The electronic device 201 may identify the distance between the electronic device 201 and the external electronic device 204 (e.g., a tag) based on time of flight (ToF). For example, the signal 220 may include information (e.g., response time information) about the time taken for the external electronic device 204 to respond to the signal transmitted by the electronic device 201. The response time information may refer to information about a time taken from a timing at which a specific electronic device receives a signal from another electronic device until a timing at which the specific electronic device transmits a response thereto. The electronic device 201 may identify the distance between the electronic device 201 and the external electronic device 204 by using the time at which the signal is transmitted to the external electronic device 204, information about the time at which the signal 220 is received, and the response time information.

The signal 220 may include transmission time information (e.g., time stamp) about the time at which the external electronic device 204 transmitted the signal 220. The electronic device 201 may identify the distance between the electronic device 201 and the external electronic device 204 using the transmission time information and the time when the electronic device 201 receives the signal 220.

The electronic device 201 may attempt to identify the position of the external electronic device 204 by receiving the signal 220 using the first antenna 211 and the second antenna 212. When the external electronic device 204 is in position A or position B, using only the first antenna 211 and the second antenna 212 may make it difficult for the electronic device 201 to identify whether the external electronic device 204 is in position A or in position B. Position A and position B may be symmetric with respect to a vertical axis of a first axis 291 between the first antenna 211 and the second antenna 212, and may each be at the same distance from the electronic device 201.

The electronic device 201 may use additional information about the external electronic device 204 in order to determine the position of the external electronic device 204. The electronic device 201 may determine the position of the external electronic device 204 by combining the positioning of the external electronic device 204 using the first antenna 211 and the second antenna 212 and the positioning of the external electronic device 204 using the first antenna 211 and the third antenna 213.

The electronic device 201 may receive additional information (e.g., signal and/or data for positioning) from the external electronic device 204. The additional information may be included in the signal 220 or may be included in a different signal. The electronic device 201 may identify the direction of the external electronic device 204 (e.g., the direction relative to the electronic device 201) using the additional information. For example, the electronic device 201 may receive an additional signal from the external electronic device 204 using the first antenna 211 and the third antenna 213, and may identify the angle of arrival of the additional signal from the external electronic device 204 (e.g., the direction of the external electronic device 204) based on the phase difference between the additional signal received by the first antenna 211 and the additional signal received by the third antenna 213. The electronic device 201 may identify the angle of arrival based on the distance between the first antenna 211 and the third antenna 213 and the phase difference. In this case, for example, the distance between the first antenna 211 and the second antenna 212 may be set to a specified first distance (e.g., about half a wavelength of the signal including the additional information) for performing beamforming on the signal including the additional information.

The distance between the electronic device 201 and the external electronic device 204 may be identified using the additional information from the external electronic device 204. For example, the additional information may include reception time information, transmission time information, and/or response time information of the external electronic device 204 (e.g., time taken for the external electronic device 204 to receive a signal and respond thereto). The electronic device 201 may identify the distance between the electronic device 201 and the external electronic device 204 based on time of flight (ToF).

The electronic device 201 may determine the position of the external electronic device 204 using additional information. By receiving additional information using the first antenna 211 and the third antenna 213, the electronic device 201 may identify that the external electronic device 204 is located at position B or position C. For example, position B and position C may be symmetric with respect to a vertical axis of a second axis 292 between the first antenna 211 and the third antenna 213, and each position may be the same distance from the electronic device 201.

The electronic device 201 may determine the position of the external electronic device 204 based on candidate positions (position A and position B) identified based on the signal 220 and candidate positions (position B and position C) identified based on the additional information. The electronic device 201 may determine the most frequent candidate position (e.g., position B), as the position of the external electronic device 204. Alternatively, the electronic device 201 may determine a region having the highest density of candidate positions as the position of the external electronic device 204.

In the example of FIG. 2, the position of the external electronic device 204 may be determined based on the results of the positioning based on the first antenna 211 and the second antenna 212 and the positioning based on the first antenna 211 and the third antenna 213. To this end, the first antenna 211, the second antenna 212, and the third antenna 213 may be arranged such that the first axis 291 between the first antenna 211 and the second antenna 212 and the second axis 292 between the first antenna 211 and the third antenna 213 are not parallel to each other. For example, the first axis 291 may be an axis connecting an arbitrary point of the first antenna 211 (e.g., a central point, an end point, or a feed point) to an arbitrary point of the second antenna 212 (e.g., a central point, an end point, or a feed point). For example, the second axis 292 may be an axis connecting an arbitrary point of the first antenna 211 (e.g., the central point, an end point, or the feed point) to an arbitrary point of the third antenna 213 (e.g., a central point, an end point, or a feed point).

In addition, the first antenna 211 and the second antenna 212 may be disposed within a first distance of each other, and the first antenna 211 and the third antenna 213 may be disposed within the first distance of each other. The first antenna 211 used in both positionings may be located between the second antenna 212 and the third antenna 213.

Figure 3:
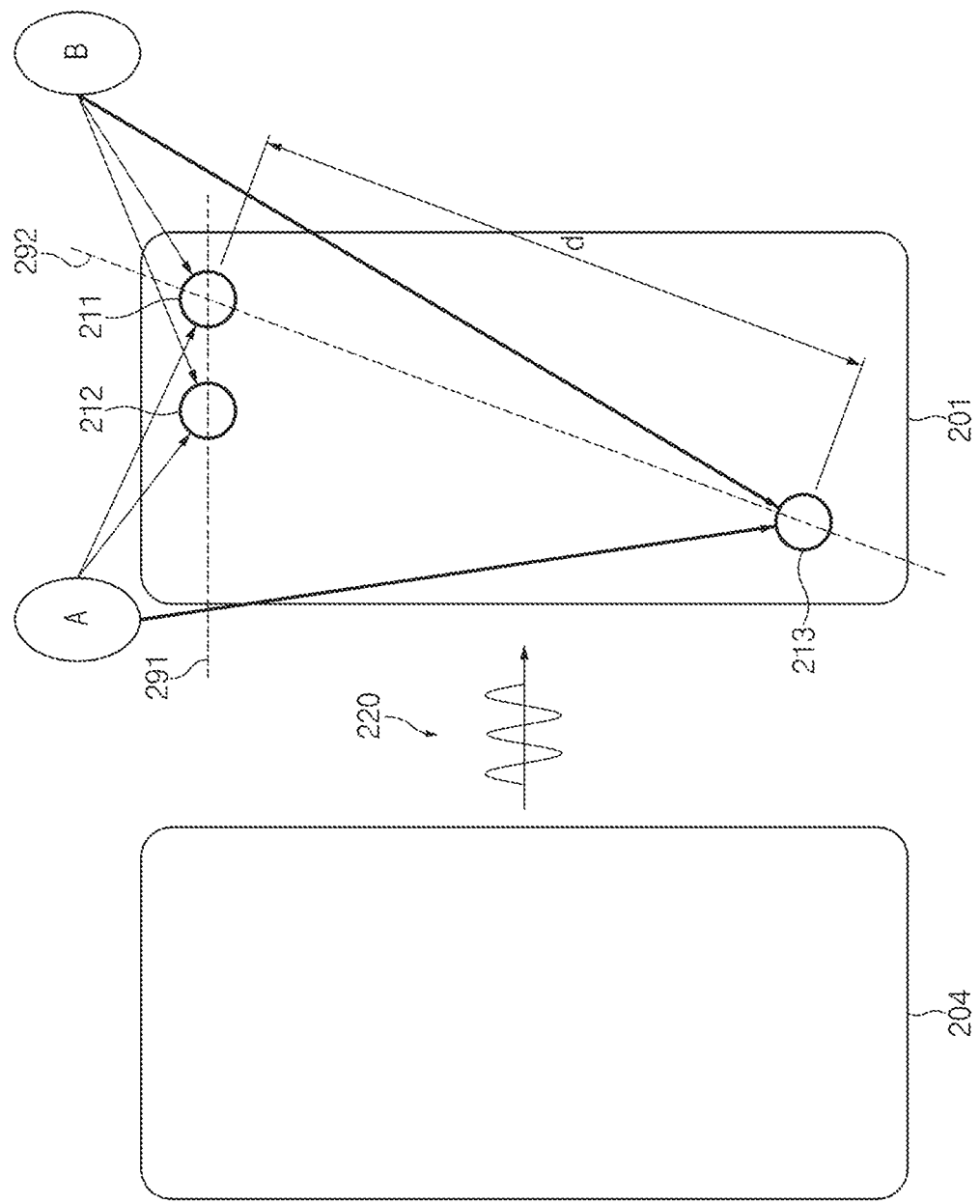
FIG. 3 illustrates an antenna arrangement for positioning of the electronic device according to an embodiment.

FIG. 3 illustrates an antenna arrangement for positioning of the electronic device 201 according to an embodiment.

The electronic device 201 may include, for example, position determination means for determining the position of the external electronic device 204. For example, the position determination means may determine the position of the external electronic device 204 according to various examples to be described below with reference to FIG. 3. Hereinafter, various position determination means may perform positioning using various antennas. The antennas may be referred to, for example, as signal transmitting and receiving means.

Referring to FIG. 3, the electronic device 201 may identify the direction of the external electronic device 204 (e.g., the direction relative to the electronic device 201) using an angle of arrival (AoA) of the signal 220 from the external electronic device 204. The distance between the electronic device 201 and the external electronic device 204 may be identified using the signal 220 from the external electronic device 204. The electronic device 201 may identify the distance between the electronic device 201 and the external electronic device 204 based on time of flight (ToF).

As described above with reference to FIG. 2, the electronic device 201 may estimate the position (position A or position B) of the external electronic device 204 by using the signal 220 received through the first antenna 211 and the second antenna 212. The electronic device 201 may also determine the position of the external electronic device 204 using additional information. In the example of FIG. 3, the first antenna 211 and the second antenna 212 may be located within a specified first distance (e.g., about half a wavelength of the signal 220).

The electronic device 201 may receive additional information from the external electronic device 204 using the third antenna 213. The additional information may be included in the signal 220 or may be included in a different signal. The additional information may include reception time information, transmission time information, and/or response time information (e.g., response processing time of the external electronic device 201). The electronic device 201 may identify the distance between the electronic device 201 and the external electronic device 204 based on ToF.

The electronic device 201 may identify the distance between the electronic device 201 and the external electronic device 204 based on the additional information received using the third antenna 213. The electronic device 201 may determine the position of the external electronic device 204 using both the additional information and the signal 220. For example, the electronic device 201 may determine, among candidate positions (position A and position B) of the external electronic device 204, the position corresponding to the distance identified based on the additional information, as the position of the external electronic device 204.

In the example of FIG. 3, the position of the external electronic device 204 may be determined based on the results of the positioning based on the first antenna 211 and the second antenna 212 and the positioning based on the third antenna 213. To this end, the first antenna 211, the second antenna 212, and the third antenna 213 may be arranged such that the first axis 291 between the first antenna 211 and the second antenna 212 and the second axis 292 between the first antenna 211 and the third antenna 213 are not parallel to each other. For example, the first axis 291 may be an axis connecting an arbitrary point (e.g., the central point, the end point, or the feed point) of the first antenna 211 to an arbitrary point (e.g., a central point, an end point, or a feed point) of the second antenna 212. For example, the second axis 292 may be an axis connecting an arbitrary point (e.g., the central point, an end point, or the feed point) of the first antenna 211 to an arbitrary point (e.g., the central point, the end point, or the feed point) of the third antenna 213.

In addition, the third antenna 213 may be disposed to be spaced apart from the first antenna 211 and/or the second antenna 212 by a specified distance d (e.g., a second distance) or more.

For example, the specified distance may be set based on the resolution or length of the wavelength of the signal received from the external electronic device 204. For example, if a theoretical error distance of the signal used for positioning is d, the third antenna 213 may be spaced apart from the first antenna and/or the second antenna 212 by a distance d or more. For example, the distance d may be about 10 cm.

Figure 4:
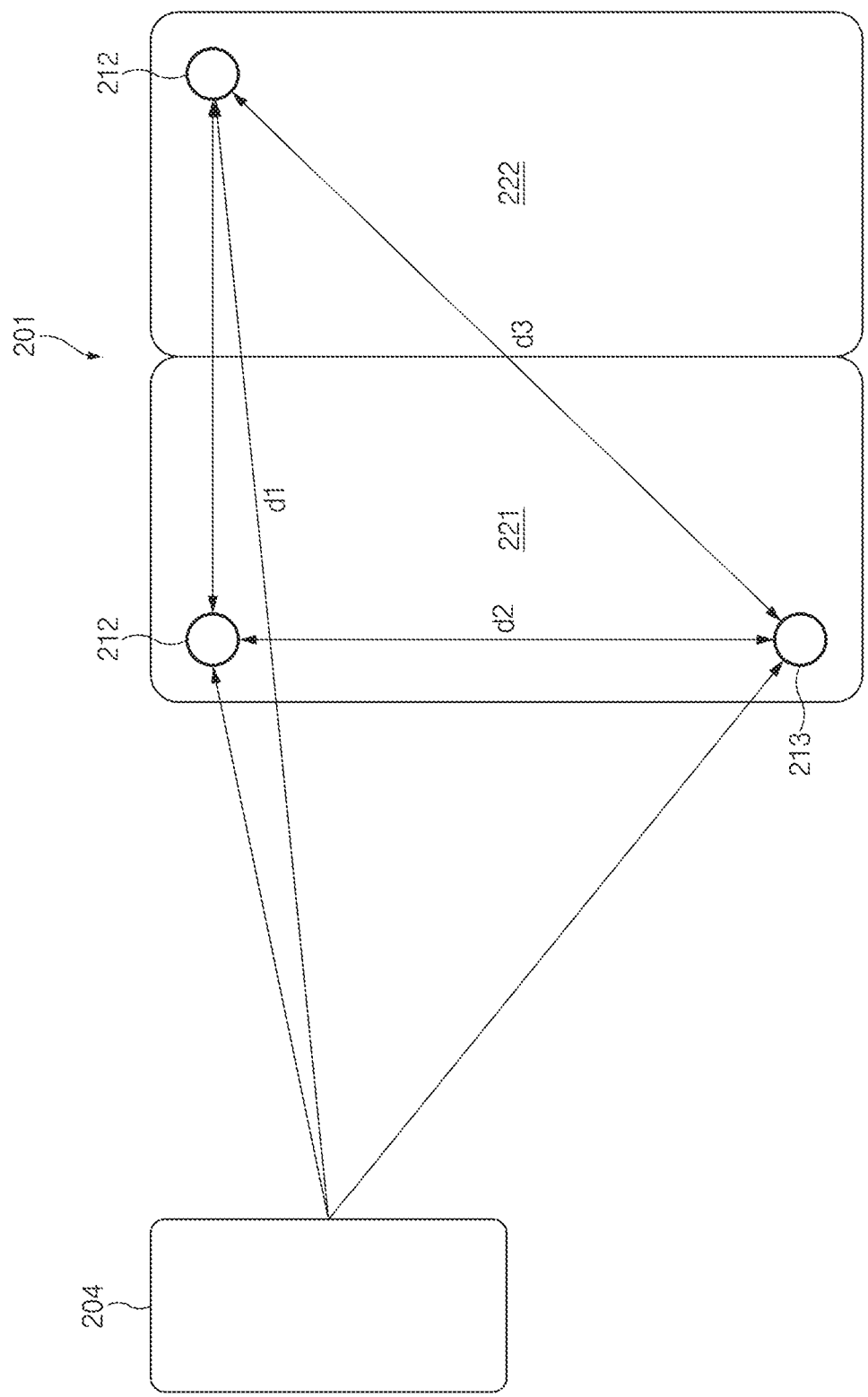
FIG. 4 illustrates an antenna arrangement for positioning of the electronic device according to an embodiment.

FIG. 4 illustrates an antenna arrangement for positioning of the electronic device 201 according to an embodiment.

Referring to FIG. 4, the electronic device 201 may be a foldable device. For example, the electronic device 201 may include a first portion 221 and a second portion 222, and the first portion 221 and the second portion 222 may be unfolded or folded. When the electronic device 201 is unfolded, the electronic device 201 may have a hardware form that allows the first antenna 211, the second antenna 212, and the third antenna 213 to be arranged to be spaced apart at a specified distance or more (e.g., the distance d of FIG. 3). For example, the first antenna 211 and the second antenna 212 may be spaced apart by a first distance d1 (e.g., the d1 is d or more), the first antenna 211 and the third antenna 213 may be spaced apart by a second distance d2 (e.g., the d2 is d or more), and the second antenna 212 and the third antenna 213 may be spaced apart by a third distance d3 (e.g., the d3 is d or more). In the example of FIG. 4, since the first antenna 211, the second antenna 212, and the third antenna 213 are spaced apart, by a significant distance, based on the resolution, a distance measurement result using each antenna may have a significant difference. The electronic device 201 may determine the position of the external electronic device 204 by using the distance measurement result of the external electronic device 204 using the first antenna 211, the distance measurement result of the external electronic device 204 using the second antenna 212, and the distance measurement result of the external electronic device 204 using the third antenna 213. For example, the electronic device 201 may determine the position of the external electronic device 204 based on triangulation.

Figure 5:
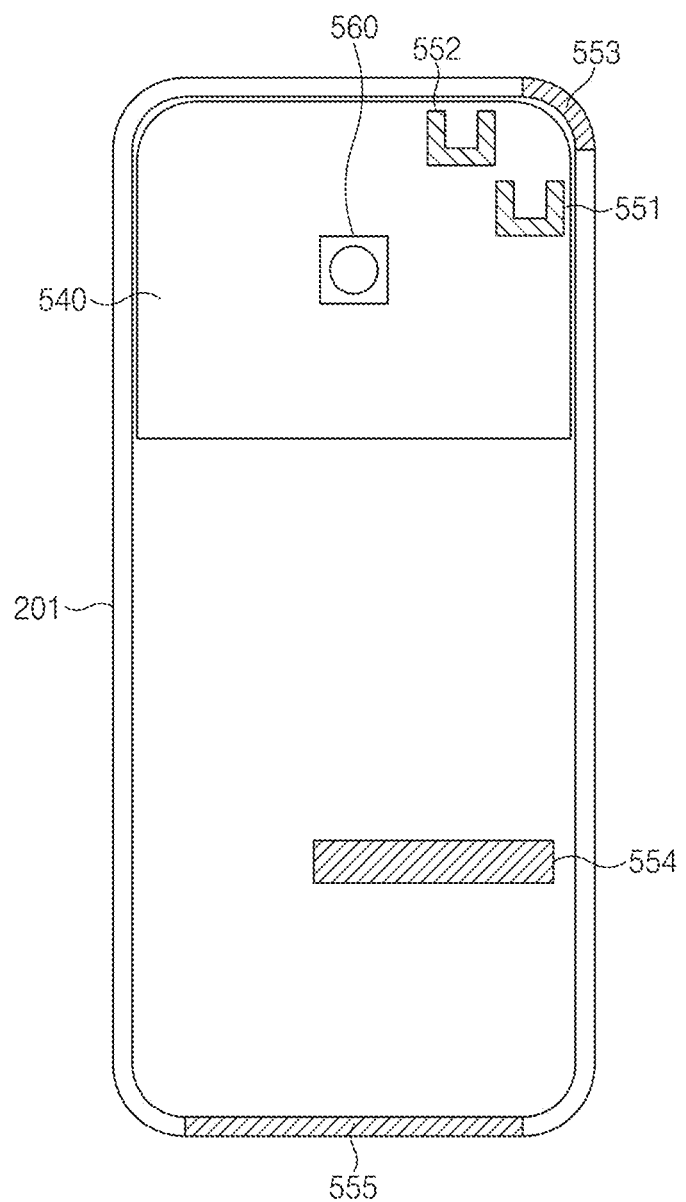
FIG. 5 illustrates antennas of the electronic device according to an embodiment.

FIG. 5 illustrates antennas of the electronic device according to an embodiment.

FIG. 5 may be a schematic diagram of the electronic device 201 when the backplate of the electronic device 201 is removed and the electronic device 201 is viewed from behind.

Referring to FIG. 5, the electronic device 201 may include various antennas. For example, a camera 560 may be a rear camera of the electronic device 201.

The electronic device 201 may include an antenna 551, an antenna 552, an antenna 553, an antenna 554, and an antenna 555. The antenna 551 and the antenna 552 may be, for example, conductive patterns on a printed circuit board (PCB) 540. The antenna 553 and the antenna 555 may be antennas positioned on the side bezel of the electronic device 201 and formed by a slit of the side bezel. For another example, the antenna 553 and the antenna 555 may correspond to at least a portion of a metal portion forming a side surface of the electronic device 201. The antenna 554 may be, for example, an antenna attached to the backplate of the electronic device 201.

For example, the antenna 551 and the antenna 552 may be metallic antennas generated by laser direct structuring (LDS). The antenna 553 may be a metallic antenna, and may be a monopole, dipole, or patch antenna. For example, the antenna 553 may be an antenna used for both a first communication protocol (e.g., UWB communication) and a second communication protocol (e.g., WiFi and/or Bluetooth).

Referring to FIG. 2 and FIG. 5, for example, the antenna 553 may correspond to the first antenna 211 in FIG. 2, the antenna 552 may correspond to the second antenna 212 in FIG. 2, and the antenna 551 may correspond to the third antenna 213 in FIG. 2.

Referring to FIG. 3 and FIG. 5, for example, the antenna 552 or the antenna 553 may correspond to the first antenna 211 in FIG. 3, the antenna 551 may correspond to the second antenna 212 in FIG. 3, and the antenna 554 or the antenna 555 may correspond to the third antenna 213.

The antennas illustrated in FIG. 5 are exemplary, and embodiments of the present disclosure are not limited thereto. For example, the antennas illustrated in FIG. 5 may be any conductive radiator. Examples of the antennas of FIG. 5 may include at least one of a metal radiator, a laser direct structuring (LDS) antenna, a conductive pattern on a flexible printed circuit board (FPCB), or a steel use stainless (SUS) antenna. For example, the antennas of FIG. 5 may include at least one of a dipole, monopole, or patch antenna.

Figure 6:
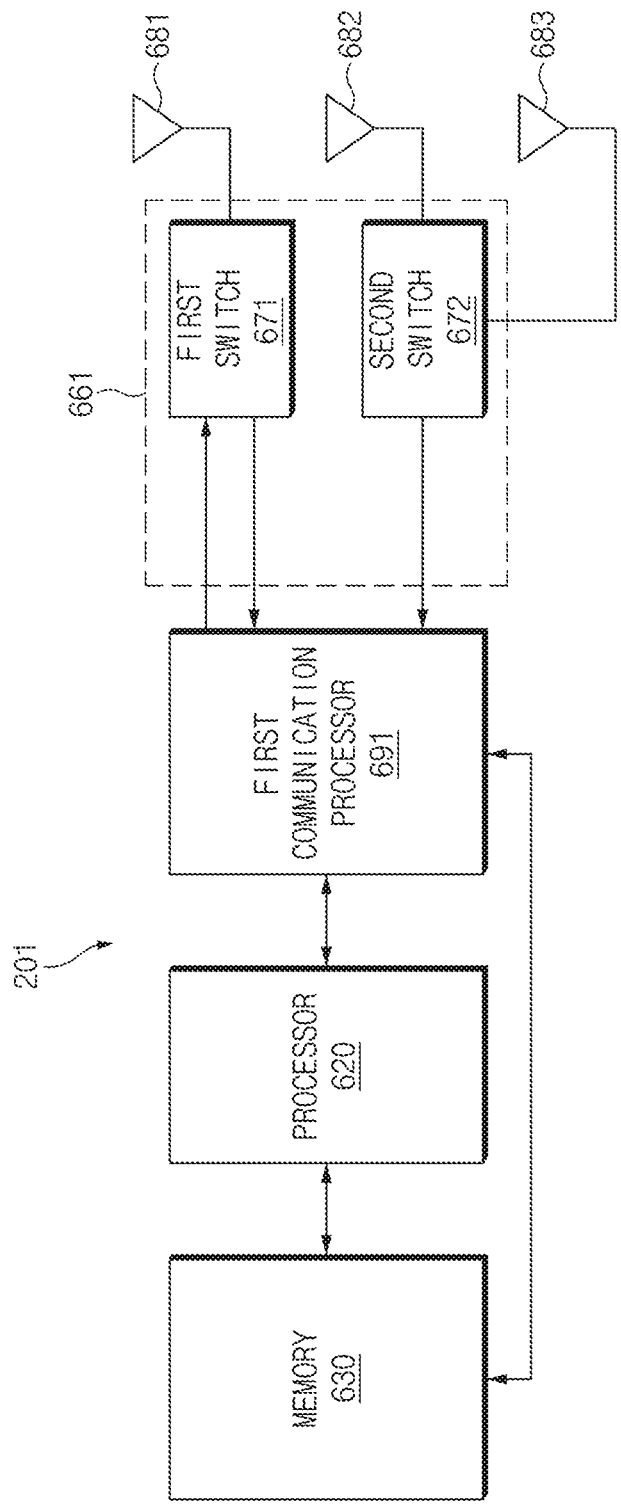
FIG. 6 illustrates a block diagram of the electronic device according to an embodiment.

FIG. 6 illustrates a block diagram of the electronic device 201 according to an embodiment.

Referring to FIG. 6, the electronic device 201 may perform positioning using three antennas associated with a first communication processor 691. In the example of FIG. 6, the electronic device 201 may perform positioning through switching between the second antenna 682 and the third antenna 683, a first communication circuit 661, and antennas 681 to 683.

According to an embodiment, the electronic device 201 may include the first communication processor 691 (e.g., the communication module 190 of FIG. 1), a processor 620 (e.g., the processor 120 of FIG. 1) electrically connected to the first communication processor 691, and a memory 630 (e.g., the memory 130 of FIG. 1). For example, the memory 630 may store one or more instructions to perform operations of the first communication processor 691 and/or the processor 620 to be described below.

The first communication processor 691 may be electrically connected to the first antenna 681 (e.g., the first antenna 211 of FIG. 2). The first antenna 681 may be connected to a transmission path or a reception path of the first communication processor 691 via the first switch 671. The first switch 671 may selectively connect the first antenna 681 to the transmission path or the reception path. For example, the first communication processor 691 may control the first switch 671.

The first communication processor 691 may be connected with the second antenna 682 (e.g., the second antenna 212 of FIG. 2) or the third antenna 683 (e.g., the third antenna 213 of FIG. 2). The second antenna 682 may be connected to the reception path of the first communication processor 691 via the second switch 672, or the third antenna 683 may be connected to the reception path of the first communication processor 691 via the second switch 672. The second switch 672 may selectively connect the second antenna 682 or the third antenna 683 to the first communication processor 691. The first switch 671 and/or the second switch 672 may be referred to as switching means. The switching means may selectively connect signal transmitting and receiving means (e.g., the first antenna 681, the second antenna 682, and/or the third antenna 683) to the first communication processor 691 (e.g., communication means). For example, the first communication processor 691 may control the second switch 672. The first communication processor 691 may be configured to communicate with the external electronic device based on a first protocol (e.g., ultra wideband (UWB) communication).

In the example of FIG. 6, radio frequency elements including the first switch 671 and the second switch 672 may be referred to as a first communication circuit 661. For example, the first communication circuit 661 may include various RF elements present between the first communication processor 691 and the antennas 681, 682, and 683. For example, the first communication circuit 661 may include a filter, an amplifier, and a phase shifter.

In the example of FIG. 6, the first communication processor 691 may have a limited number of ports. For example, the first communication processor 691 may include one source port and two destination ports. For example, in order to overcome a functional limitation due to the limited number of ports, the electronic device 201 may include the first communication circuit 661. The configuration of the first communication circuit 661 of FIG. 6 is exemplary, and embodiments of the present disclosure are not limited thereto. For example, the first communication processor 691 may include more ports than those illustrated in FIG. 6. For example, each of the second antenna 682 and the third antenna 683 may be connected to the first communication processor 691 via separate ports. For another example, at least one of the second antenna 682 and the third antenna 683 may be connected to the first communication processor 691 via the source port and the destination port.

The first communication processor 691 may transmit the first signal to an external electronic device (e.g., the external electronic device 204 of FIG. 2) using the first antenna 681. For example, the first communication processor 691 may transmit the first signal in response to the signal received from the external electronic device 204. The first communication processor 691 may connect the first antenna 681 to the transmission path of the first communication processor 691 using the first switch 671, and may transmit the first signal to the external electronic device 204 using the first antenna 681. The first signal may include first data. The first data may include transmission time information, reception time information, and/or response time information. The transmission time information may include information about the time at which the electronic device 201 transmits the first signal, the reception time information may include information about the time at which the electronic device 201 received a signal from the external electronic device 204, and the response time information may include information about the time taken for the external electronic device 204 to deal with the response signal.

The first communication processor 691 may receive, using the first antenna 681 and the third antenna 683, a fourth signal including fourth data from the external electronic device. The first communication processor 691 may connect the first antenna 681 to the reception path of the first communication processor 691 using the first switch 671, and may connect the second antenna 682 to the reception path of the first communication processor 691 using the second switch 672. The first communication processor 691 and/or the processor 620 may identify a phase difference between the second signal received by the first antenna 681 and the second signal received by the second antenna 682. The first communication processor 691 and/or the processor 620 may acquire time information (e.g., the time when the external electronic device 204 transmits the second signal, the time when the external electronic device 204 receives the first signal, and/or the response time taken for the external electronic device 204 to transmit the second signal after receiving the first signal) included in the second data.

The first communication processor 691 may transmit a third signal to an external electronic device (e.g., the external electronic device 204 of FIG. 2) using the first antenna 681. For example, the first communication processor 691 may transmit the third signal in response to the signal received from the external electronic device 204. The first communication processor 691 may connect the first antenna 681 to the transmission path of the first communication processor 691 using the first switch 671, and may transmit the third signal to the external electronic device 204 using the first antenna 681. The third signal may include third data. The third data may include transmission time information of the third signal, reception time information of the previously received signal, and/or response time information.

The first communication processor 691 may receive, using the first antenna 681 and the third antenna 683, a fourth signal including fourth data from the external electronic device. The first communication processor 691 may connect the first antenna 681 to the reception path of the first communication processor 691 using the first switch 671, and may connect the third antenna 683 to the reception path of the first communication processor 691 using the second switch 672. The first communication processor 691 and/or the processor 620 may identify a phase difference between the fourth signal received by the first antenna 681 and the fourth signal received by the third antenna 683. The first communication processor 691 and/or the processor 620 may acquire time information included in the fourth data (e.g., the time when the external electronic device 204 transmits the fourth signal, the time when the external electronic device 204 receives the third signal, and/or the time taken for the external electronic device 204 to transmit the fourth signal after receiving the third signal).

The first communication processor 691 and/or the processor 620 may determine the position of the external electronic device 204 based on the phase difference and time information of the second data and the phase difference and time information of the fourth data. For example, the first communication processor 691 and/or the processor 620 may determine the position of the external electronic device based on the phase difference and time information based on the second signal and the fourth signal. For example, the first communication processor 691 and/or the processor 620 may determine the position commonly identified by the second signal and the fourth signal as the position of the external electronic device 204.

The configurations of the electronic device 201 illustrated in FIG. 6 are exemplary, and embodiments of the present disclosure are not limited thereto. For example, each switch may be replaced with a different configuration (e.g., a coupler).

Figure 7:
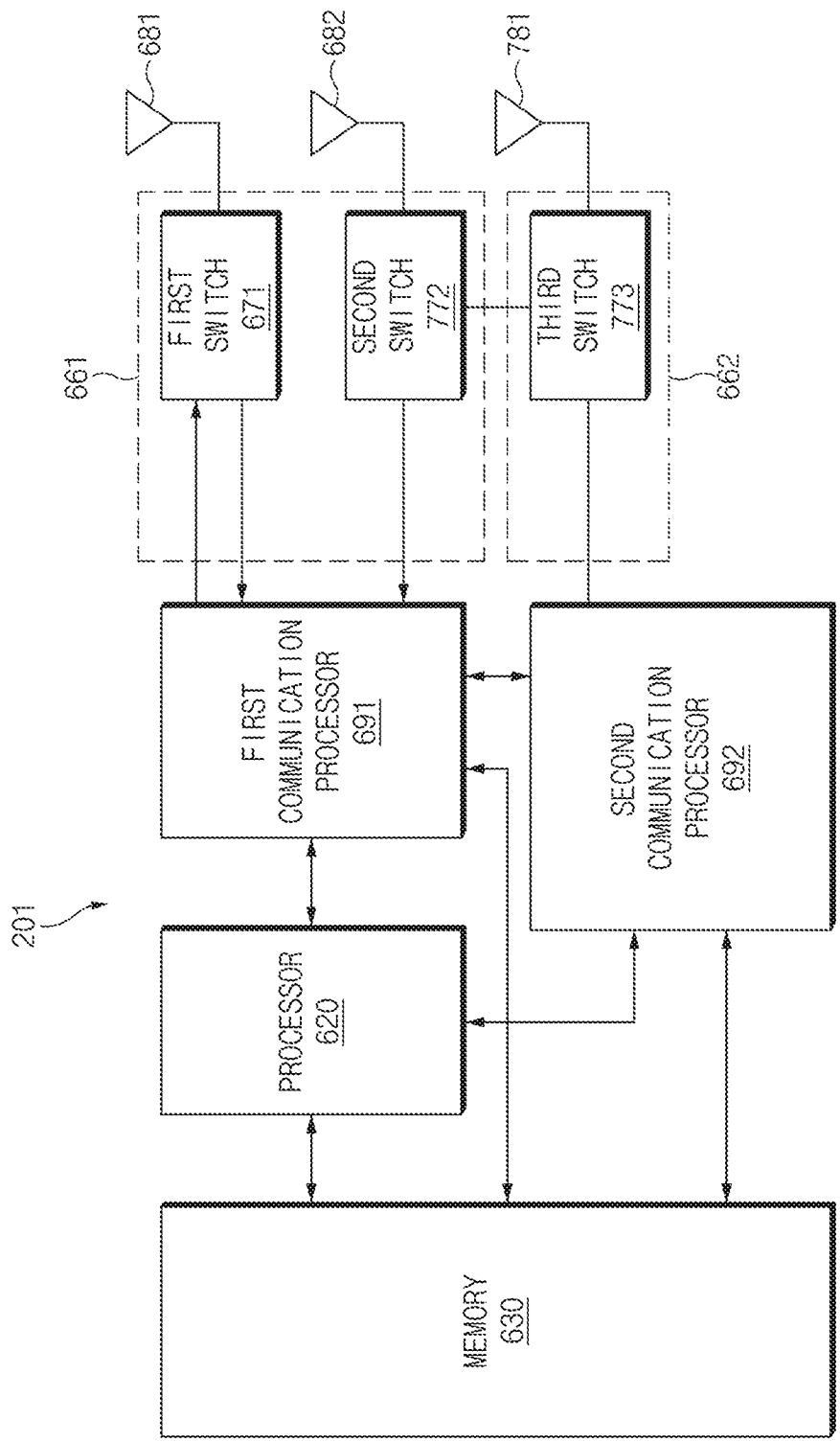
FIG. 7 illustrates a block diagram of the electronic device according to an embodiment.

FIG. 7 illustrates a block diagram of the electronic device 201 according to an embodiment.

Referring to FIG. 7, in addition to the components illustrated in FIG. 6, the electronic device 201 includes a second communication processor 692 and a second communication circuit 662 including a third switch 773, which is connected to a fourth antenna 781.

The electronic device 201 may perform positioning using two antennas associated with the first communication processor 691 and a fourth antenna 781 associated with a second communication processor 692. In the example of FIG. 7, the electronic device 201 may perform positioning through switching between the second antenna 682 and the fourth antenna 781. In the example of FIG. 7, the fourth antenna 781 may be shared by the first communication processor 691 and the second communication processor 692.

The fourth antenna 781 of FIG. 7 may be selectively connected to the first communication processor 691 or the second communication processor 692. For example, the second communication processor 692 may be configured to communicate with an external electronic device based on a second protocol (e.g., Bluetooth, cellular, and/or Wi-Fi) different from the first protocol. Hereinafter, unless otherwise described, the descriptions above with reference to FIG. 6 may be applied to FIG. 7 as well. For example, the memory 630 may store one or more instructions to perform operations of the first communication processor 691, the second communication processor 692, and/or the processor 620 to be described below.

The electronic device 201 may further include the second communication processor 692 (e.g., the communication module 190 of FIG. 1). For example, the second communication processor 692 may be connected with the fourth antenna 781 via the second communication circuit 662. The second communication circuit 662 may include a third switch 773. The third switch 773 may connect the fourth antenna 781 to the reception path of the first communication processor 691 via the second switch 772, or may connect the fourth antenna 781 to the second communication processor 692. The third switch 773 may selectively connect the fourth antenna 781 to the first communication processor 691 or the second communication processor 692. For example, the third switch 773 may be controlled by the first communication processor 691 and/or the second communication processor 692.

The electronic device 201 may determine the position of the external electronic device 204 based on the positioning using the first antenna 681 and the second antenna 682 and the positioning using the first antenna 681 and the fourth antenna 781 (e.g., used similarly to the third antenna 683 of FIG. 6), as is described above with reference to FIG. 6. In the example of FIG. 7, the first communication processor 691 may use an antenna used by another communication module (e.g., the second communication processor 692). The structure of the electronic device 201 of FIG. 7 is exemplary, and embodiments of the present disclosure are not limited thereto. For example, the second switch 772 and the third switch 773 may be implemented as one switch.

Figure 8A:
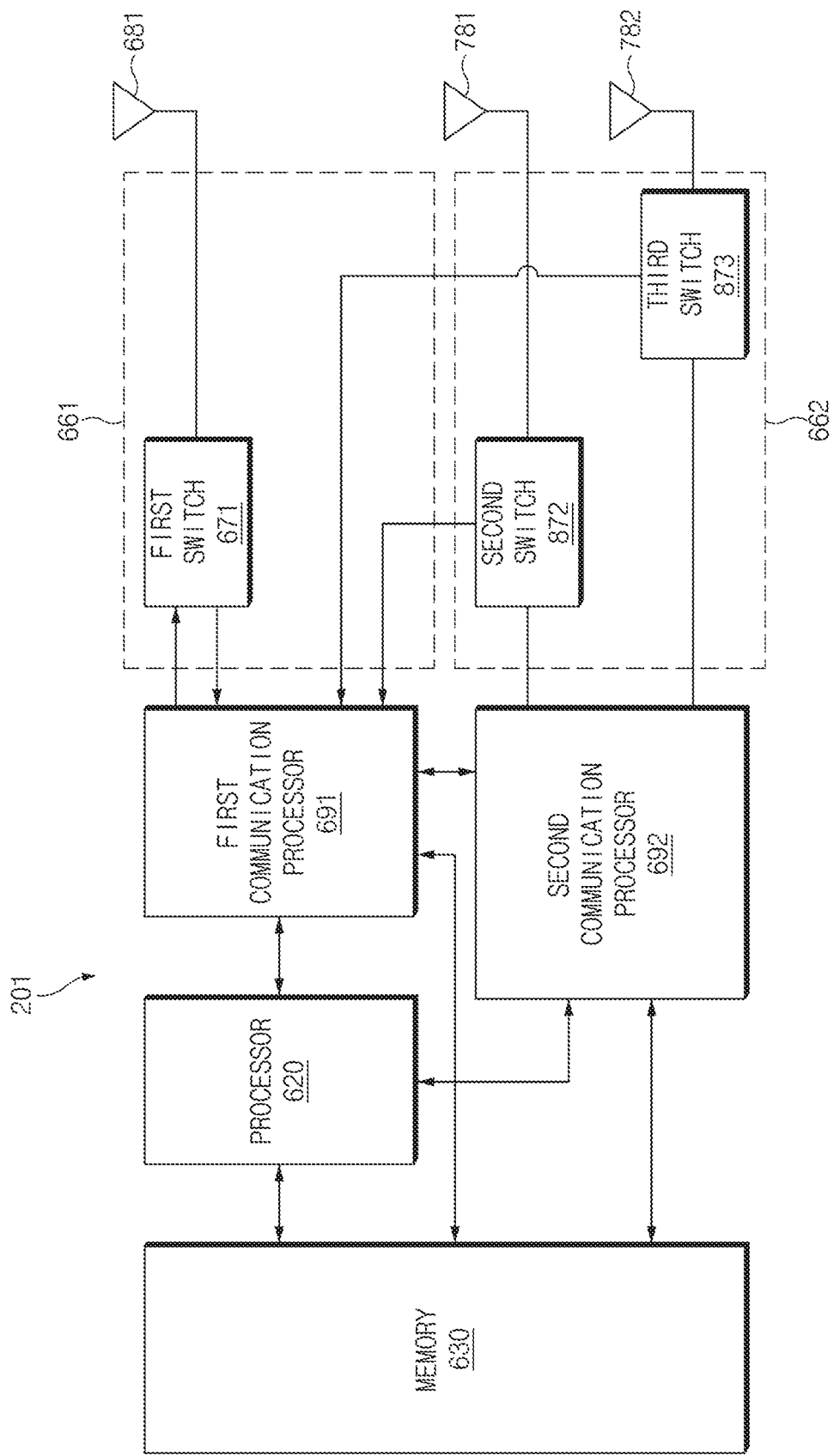
FIG. 8a illustrates a block diagram of the electronic device according to an embodiment.

FIG. 8a illustrates a block diagram of the electronic device 201 according to an embodiment.

Referring to FIG. 8a, the electronic device 201 is similar to FIG. 7, except that the second communication circuit 662 includes a second switch 872, which is connected to a fourth antenna 781, and a third switch 873, which is connected to a fifth antenna 782. The electronic device 201 may perform positioning using the first antenna 681 associated with the first communication processor 691 and the fourth antenna 781 and a fifth antenna 782 associated with the second communication processor 692. In the example of FIG. 8a, the electronic device 201 may perform positioning through switching between the fourth antenna 781 and the fifth antenna 782. In the example of FIG. 8a, the fourth antenna 781 and the fifth antenna 782 may be shared by the first communication processor 691 and the second communication processor 692.

With reference to FIG. 8a, unless otherwise described, described, descriptions of components having the same reference numbers as those described above with reference to FIGS. 6 and 7 may operate as described with reference to FIGS. 6 and 7.

In the example of FIG. 8a, the second switch 872 may connect the fourth antenna 781 to the second communication processor 692 or the first communication processor 691. The third switch 873 may connect the fifth antenna 782 to the second communication processor 692 or the first communication processor 691. For example, the first communication processor 691 and/or the second communication processor 692 may control the second switch 872 and/or the third switch 873. In the example of FIG. 8a, the fourth antenna 781 may correspond to the second antenna 682 of FIG. 6, and the fifth antenna 782 may correspond to the third antenna 683 of FIG. 6. Therefore, in a similar manner to that described above with reference to FIG. 6, the electronic device 201 may determine the position of the external electronic device 204.

The structure of the electronic device 201 of FIG. 8a is exemplary, and embodiments of the present disclosure are not limited thereto. For example, in FIG. 8a, the fourth antenna 781 and the fifth antenna 782 are connected to separate destination ports of the first communication processor 691, but the fourth antenna 781 and the fifth antenna 782 may be connected to the same destination port of the first communication processor 691.

Figure 8B:
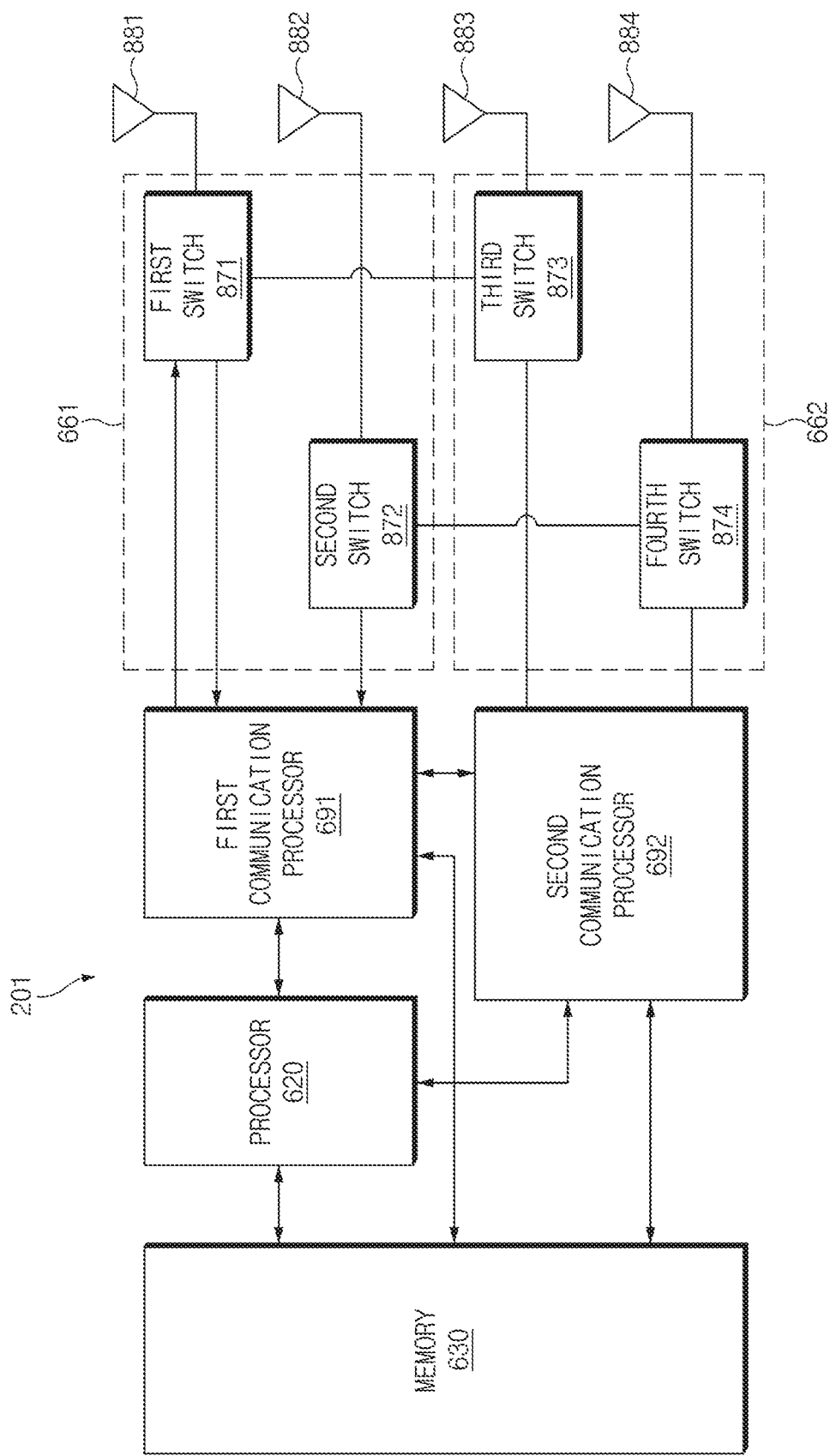
FIG. 8b illustrates a block diagram of the electronic device according to an embodiment.

FIG. 8b illustrates a block diagram of the electronic device 201 according to an embodiment.

Referring to FIG. 8b, the first communication processor 691 and the second communication processor 692 may share all antennas.

With reference to FIG. 8b, unless otherwise described, the components having the same reference numbers as those described above with reference to FIGS. 6, 7, and 8a may operate as described with reference to FIGS. 6, 7, and 8a.

In the example of FIG. 8a, the first switch 871 may connect the first antenna 881 or the third antenna 883 to the first communication processor 691 under the control of the first communication processor 691 and/or the second communication processor 692. The third switch 873 may connect the third antenna 883 to the first communication processor 691 or the second communication processor 692 under the control of the first communication processor 691 and/or the second communication processor 692. For example, the first switch 871 and the third switch 873 may be implemented as one switch.

The second switch 872 may connect the second antenna 882 or the fourth antenna 884 to the first communication processor 691 under the control of the first communication processor 691 and/or the second communication processor 692. The fourth switch 875 may selectively connect the fourth antenna 884 to the first communication processor 691 or the second communication processor 692. For example, the second switch 872 and the fourth switch 874 may be implemented as one switch.

For example, in the example of FIG. 8b, the first antenna 881 or the third antenna 883 may correspond to the first antenna 681 of FIG. 6. The second antenna 882 may correspond to the second antenna 682 of FIG. 6, and the fourth antenna 884 may correspond to the third antenna 683 of FIG. 6. Therefore, in a similar manner to that described above with reference to FIG. 6, the electronic device 201 may determine the position of the external electronic device 204.

For another example, in the example of FIG. 8b, the second antenna 882 or the fourth antenna 884 may correspond to the second antenna 212 of FIG. 3. The first antenna 881 may correspond to the first antenna 211 of FIG. 3, and the third antenna 883 may correspond to the third antenna 213 of FIG. 3. According to a method with reference to FIG. 9 to be described below, the electronic device 201 may determine the position of the external electronic device 204.

Figure 9:
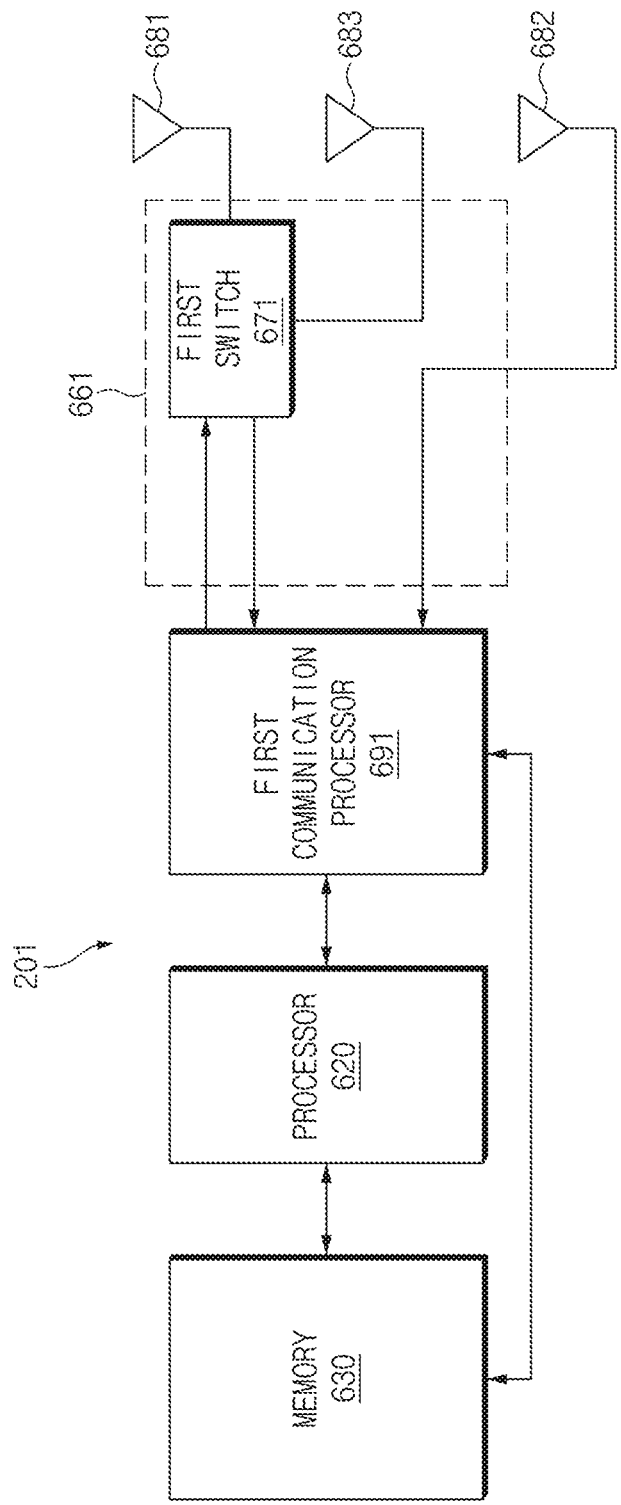
FIG. 9 illustrates a block diagram of the electronic device according to an embodiment.

FIG. 9 illustrates a block diagram of the electronic device 201 according to an embodiment.

Referring to FIG. 9, the electronic device 201 includes the first communication processor 691, the processor 620 electrically connected to the first communication processor 691, the memory 630, the first communication circuit 661, which includes the first switch 671, and antennas 681 to 683.

The memory 630 may store one or more instructions to perform operations of the first communication processor 691 and/or the processor 620 to be described below. The first communication processor 691 may be configured to communicate with the external electronic device based on the first protocol (e.g., ultra wideband (UWB) communication).

The first communication processor 691 may be electrically connected with the first antenna 681 (e.g., the first antenna 211 of FIG. 3) or the third antenna 683 (e.g., the third antenna 213 of FIG. 3). The first antenna 681 may be connected to the transmission path or the reception path of the first communication processor 691 via the first switch 671. The third antenna 683 may be connected to the transmission path or the reception path of the first communication processor 691 via the first switch 671. The first switch 671 may selectively connect one of the first antenna 681 and the third antenna 683 to the transmission path or the reception path under the control of the first communication processor 691.

The first communication processor 691 may be electrically connected to the second antenna 682 (e.g., the second antenna 212 of FIG. 3). The second antenna 682 may be connected to the reception path of the first communication processor 691.

In the example of FIG. 9, the first communication processor 691 may have a limited number of ports. For example, the first communication processor 691 may include one source port and two destination ports. For example, in order to overcome a functional limitation due to the limited number of ports, the electronic device 201 may include the first communication circuit 661. The configuration of the first communication circuit 661 of FIG. 9 is exemplary, and embodiments of the present disclosure are not limited thereto.

The first communication processor 691 may transmit the first signal to an external electronic device (e.g., the external electronic device 204 of FIG. 3) using the first antenna 681. For example, the first communication processor 691 may transmit the first signal in response to the signal received from the external electronic device 204. The first communication processor 691 may connect the first antenna 681 to the transmission path of the first communication processor 691 using the first switch 671, and may transmit the first signal to the external electronic device 204 using the first antenna 681. The first signal may include first data. The first data may include transmission time information, reception time information, and/or response time information. The transmission time information may include information about the time at which the electronic device 201 transmits the first signal, the reception time information may include information about the time at which the electronic device 201 has previously received a signal from the external electronic device 204, and the response time information may include information about the time taken from when the electronic device 201 has received a signal from the external electronic device 204 until it transmits the first signal.

The first communication processor 691 may receive the second signal including second data from the external electronic device 204 using the first antenna 681 and the second antenna 682. The first communication processor 691 may connect the first antenna 681 to the reception path of the first communication processor 691 using the first switch 671, and may receive the second signal using the first antenna 681 and the second antenna 682. The first communication processor 691 and/or the processor 620 may identify a phase difference between the second signal received by the first antenna 681 and the second signal received by the second antenna 682. The first communication processor 691 and/or the processor 620 may acquire time information included in the second data (e.g., the time when the external electronic device 204 transmits the second signal, the time when the external electronic device 204 receives the first signal, and/or the time taken for the external electronic device 204 to transmit the second signal after receiving the first signal).

The first communication processor 691 may transmit the third signal to an external electronic device (e.g., the external electronic device 204 of FIG. 2) using the third antenna 683. For example, the first communication processor 691 may transmit the third signal in response to the signal received from the external electronic device 204. The first communication processor 691 may connect the third antenna 683 to the transmission path of the first communication processor 691 using the first switch 671, and may connect the third signal to the external electronic device 204 using the third antenna 683. The third signal may include the third data. The third data may include transmission time information of the third signal, reception time information of the previously received signal, and/or information about the time taken to transmit the third signal (response).

The first communication processor 691 may receive the fourth signal including the fourth data from the external electronic device 204 using the third antenna 683. The first communication processor 691 may connect the third antenna 683 to the reception path of the first communication processor 691 using the first switch 671. The first communication processor 691 and/or the processor 620 may acquire time information included in the fourth data of the fourth signal received by the third antenna 683 (e.g., the time when the external electronic device 204 transmits the fourth signal, the time when the external electronic device 204 receives the third signal, and/or the time taken for the external electronic device 204 to transmit the fourth signal after receiving the third signal).

The first communication processor 691 and/or the processor 620 may determine the position of the external electronic device from the phase difference and time information based on the second signal and time information based on the fourth signal.

The components of the electronic device 201 illustrated in FIG. 9 are exemplary, and embodiments of the present disclosure are not limited thereto. For example, each switch may be replaced with a different configuration (e.g., coupler).

A positioning method related to FIG. 3 for the electronic device 201 described above with reference to FIG. 9 may be performed by the electronic device 201 having a different structure. For example, similar to the example of FIG. 7, the third antenna 683 may be selectively connected to the second communication processor (e.g., the second communication processor 692 of FIG. 7) or the first communication processor 691. For another example, the second antenna 682 may be selectively connected to the second communication processor (e.g., the second communication processor 692 of FIG. 7) or the first communication processor 691.

As described above with reference to FIG. 6 to FIG. 8b, the positioning method of the electronic device 201 of FIG. 2 may be performed by the electronic device 201 in which the second antenna (e.g., the second antenna 212 in FIG. 2) or the third antenna (e.g., the third antenna 213 in FIG. 2) is selectively connected to the reception path. As described above with reference to FIG. 9, the positioning method of the electronic device 201 of FIG. 3 may be performed by the electronic device 201 in which the first antenna (e.g., the first antenna 211 of FIG. 3) or the third antenna (e.g., the third antenna 213 of FIG. 3) is selectively connected to the transmission path.

For the electronic device 201 of FIG. 4, the electronic device 201 may transmit a signal for positioning using each of the first antenna 211, the second antenna 212, and the third antenna 213. In this case, the first communication circuit 661 may include separate transmission paths for each of the first antenna 211, the second antenna 212, and the third antenna 213.

Figure 10A:
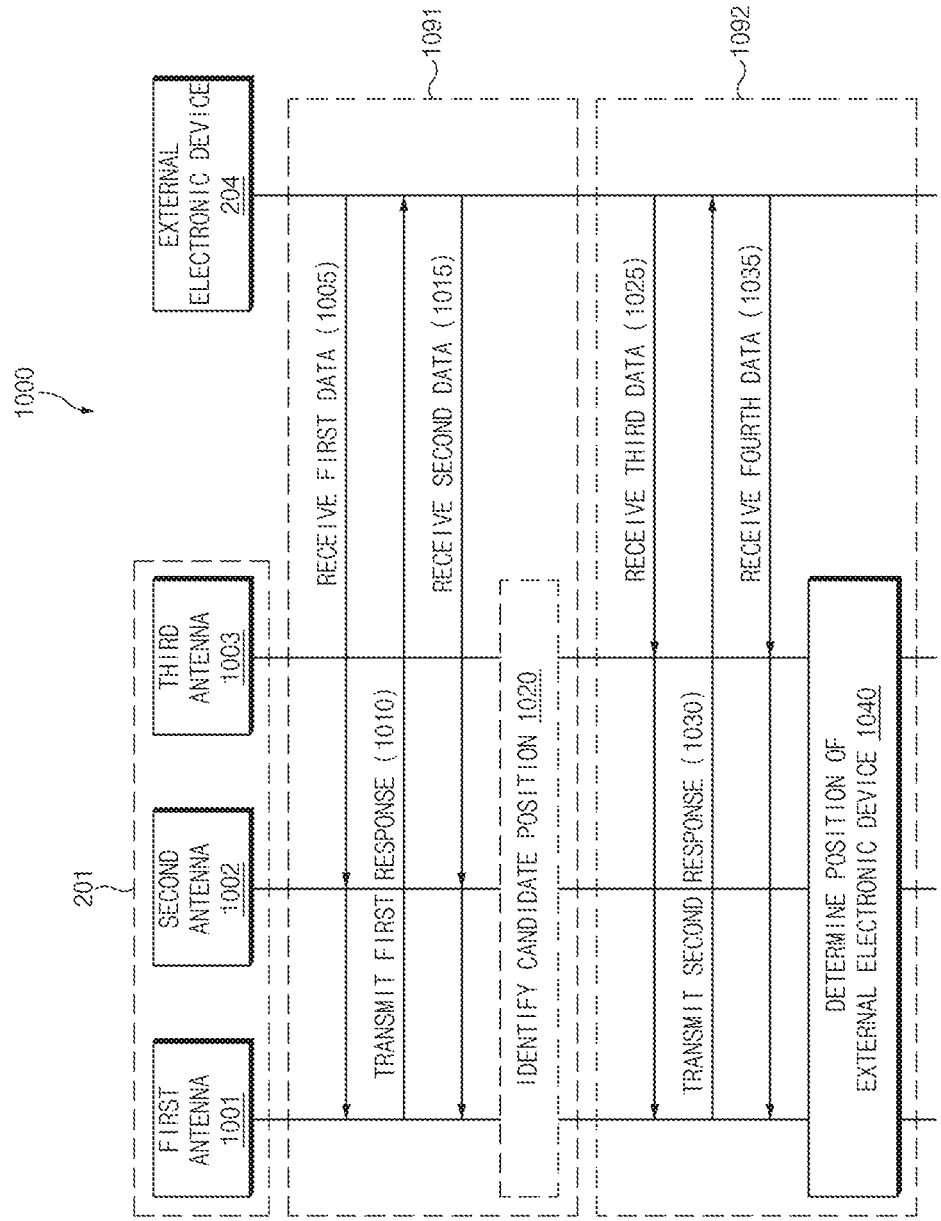
FIG. 10a illustrates a signal flow diagram of a position determination method according to an embodiment.

FIG. 10a illustrates a signal flow diagram 1000 of a position determination method according to an embodiment.

Referring to FIG. 10a, the electronic device 201 may include a first antenna 1001 (e.g., the first antenna 211 in FIG. 2) and a second antenna 1002 (e.g., the second antenna 212 in FIG. 2), and a third antenna (e.g., the third antenna 213 of FIG. 2). For example, the electronic device 201 may having a similar structure as described above with reference to any of FIG. 6 to FIG. 8b.

In operation 1005, the electronic device 201 may receive first data from the external electronic device 204 using the first antenna 1001 and/or the second antenna 1002. For example, the electronic device 201 may receive a first signal including the first data. The first signal may be a signal for polling of the electronic device 201. For example, the first data may include transmission time information about the time at which the external electronic device 204 transmits the first signal. The first data may include channel identification information. The first data may include information for timing synchronization between the external electronic device 204 and the electronic device 201.

In operation 1010, the electronic device 201 may transmit a first response to the external electronic device 204 using the first antenna 1001. For example, the electronic device 201 may include, in the first response, information (e.g., the transmission time, the reception time, and/or the response time) about the time when the first response is transmitted.

In operation 1015, the electronic device 201 may receive second data from the external electronic device 204 using the first antenna 1001 and the second antenna 1002. For example, the electronic device 201 may receive the second signal including the second data. The second data may include information (e.g., response time) about the time at which the external electronic device 204 transmits the second signal. The second data may further include, for example, a channel identifier, information about the time at which the external electronic device 204 transmits the first data, and/or information about the time at which the external electronic device 204 received the first response.

For example, the electronic device 201 may perform operation 1005, operation 1010, and operation 1015 according to two way ranging (TWR) of the UWB standard (e.g., the Institute of Electrical and Electronics Engineers (IEEE) 802.15.4a standard).

In operation 1020, the electronic device 201 may identify candidate positions of the external electronic device 204. For example, the electronic device 201 may identify candidate directions of the external electronic device 204 based on the phase difference of the second signal received using the first antenna 1001 and the second antenna 1002 in operation 1015. For example, the electronic device 201 may identify the distance between the electronic device 201 and the external electronic device 204 using the second data. The electronic device 201 may determine the distance between the electronic device 201 and the external electronic device 204 based on the ToF. For example, the electronic device 204 may identify candidate positions of the external electronic device 204 based on the candidate directions and the distance.

Alternatively, operation 1020 may be omitted. Pieces of information based on the second data may be used for the determination of the external electronic device together with pieces of information based on fourth data to be described later. In this case, the electronic device 201 may omit operation 1020, and may use pieces of information acquired in operation 1005 to operation 1015, later in operation 1040 instead.

For example, operation 1005, operation 1010, operation 1015, and operation 1020 may be referred to as a first positioning 1091. The electronic device 201 may perform the first positioning 1091 by receiving a signal from the external electronic device 204 using a plurality of antennas.

It is to be understood that the first positioning 1091 simultaneously performs AoA measurement and ranging (e.g., two way ranging (TWR)) using the first antenna 1001 and the second antenna 1002.

In operation 1025, the electronic device 201 may receive third data from the external electronic device 204 using the first antenna 1001 and/or the third antenna 1003. For example, the electronic device 201 may allow the third antenna 1003 to be connected to the communication processor by controlling a wireless communication circuit associated with the communication processor. For example, the electronic device 201 may receive the third signal including the third data. The third signal may be a signal for polling of the electronic device 201. For example, the third data may include transmission time information about the time when the external electronic device 204 transmits the third signal. The third data may include channel identification information. The third data may include information for timing synchronization between the external electronic device 204 and the electronic device 201.

In operation 1030, the electronic device 201 may transmit a second response to the external electronic device 204 using the first antenna 1001. For example, the electronic device 201 may include, in the second response, information (e.g., response time information) about the time when the second response is transmitted.

In operation 1035, the electronic device 201 may receive the fourth data from the external electronic device 204 using the first antenna 1001 and the third antenna 1003. For example, the electronic device 201 may receive the fourth signal including the fourth data. The fourth data may include information (e.g., response time information) about the time when the external electronic device 204 transmits the fourth signal. The fourth data may further include, for example, a channel identifier, information about the time when the external electronic device 204 transmits the third data, and/or information about the time when the external electronic device 204 receives the second response.

For example, the electronic device 201 may perform operation 1025, operation 1030, and operation 1035 according to the two way ranging (TWR) of the UWB standard.

In operation 1040, the electronic device 201 may determine the position of the external electronic device 204. For example, the electronic device 201 may identify candidate directions of the external electronic device 204 based on the phase difference of the fourth signal received using the first antenna 1001 and the third antenna 1003 in operation 1035. For example, the electronic device 201 may identify the distance between the electronic device 201 and the external electronic device 204 using the fourth data. The electronic device 201 may determine the distance between the electronic device 201 and the external electronic device 204 based on the ToF. For example, the electronic device 204 may determine one of the candidate positions identified in operation 1020 as the position of the external electronic device 204, based on the candidate directions and the distance. For another example, the electronic device 201 may determine the position of the external electronic device 204 based on the direction and the distance estimated from the second data and the direction and the distance estimated from the fourth data.

For example, operation 1025, operation 1030, operation 1035, and operation 1040 may be referred to as a second positioning 1092. The electronic device 201 may perform the second positioning 1092 by receiving a signal from the external electronic device 204 using a plurality of antennas. It is to be understood that the second positioning 1092 simultaneously performs AoA measurement and ranging (e.g., two way ranging (TWR)) using the first antenna 1001 and the third antenna 1003.

In the example of FIG. 10*a*, the external electronic device 204 is illustrated to transmit a polling signal (e.g., first data and third data); however, embodiments of the present disclosure are not limited thereto. For example, the electronic device 201 may transmit a polling signal to the external electronic device 204. In this case, the transmitting and receiving ends of FIG. 10*a* may be changed with each other. For example, in operation 1005, the electronic device 201 may transmit the first data to the external electronic device 204 using the first antenna 1001 and/or the second antenna 1002. In this case, the electronic device 201 may receive the first response from the external electronic device 204 using the first antenna 1001 and the second antenna 1002. The first response may include information (e.g., response time information) about the time taken for the external electronic device 204 to transmit the first response after receiving the first data. The electronic device 201 may determine the distance between the electronic device 201 and the external electronic device 204 based on the transmission time of the first data, the reception time of the first response time, and the response time information. Furthermore, the electronic device 201 may acquire information about the phase difference between the first antenna 1001 and the second antenna 1002, which are associated with the reception of the first response. For positioning of the external electronic device 204, in operation 1015, the electronic device 201 may transmit the second data to the external electronic device 204. For example, in operation 1025, the electronic device 201 may transmit the third data (e.g., polling) to the external electronic device using the first antenna 1001 and/or the third antenna 1003. In operation 1030, the electronic device 201 may receive the second response using the first antenna 1001 and the third antenna 1003. The second response may include information (e.g., response time information) about the time taken for the external electronic device 204 to transmit the second response after receiving the third data. The electronic device 201 may determine the distance between the electronic device 201 and the external electronic device 204 based on the transmission time of the third data, the reception time of the second response time, and the response time information. Furthermore, the electronic device 201 may acquire information about the phase difference between the first antenna 1001 and the third antenna 1003, which are associated with the reception of the second response. For positioning of the external electronic device 204, in operation 1035, the electronic device 201 may transmit the fourth data to the external electronic device 204. In operation 1040, the electronic device 201 may determine the position of the external electronic device based on the phase difference associated with the reception of the first response, the time information associated with the first response, the phase difference associated with the reception of the second response, and the time information associated with the second response. For example, the electronic device 201 may determine the position of the external electronic device 204 according to various methods to be described below with reference to FIG. 10*b* and FIG. 10*c*.

Figure 10B:
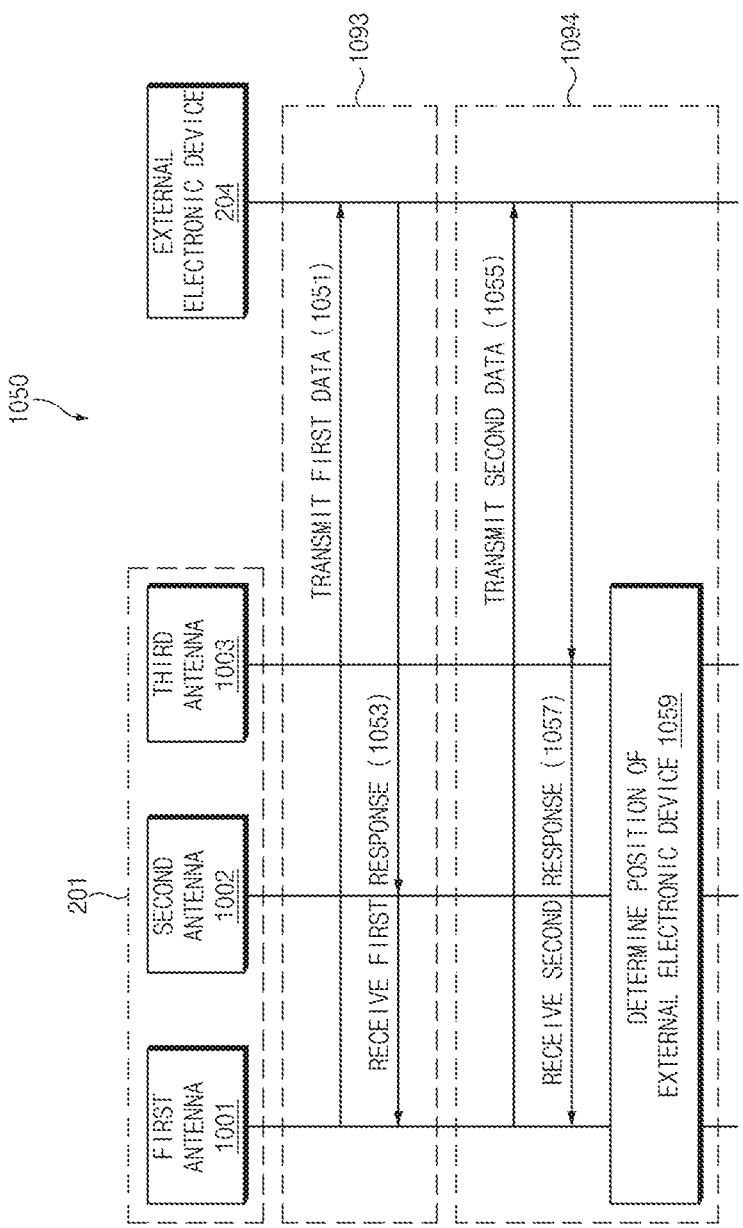
FIG. 10b illustrates a signal flow diagram of the position determination method according to an embodiment.

FIG. 10*b* illustrates a signal flow diagram 1050 of the position determination method according to an embodiment.

Referring to FIG. 10*b*, the electronic device 201 may include the first antenna 1001 (e.g., the first antenna 211 in FIG. 2) and the second antenna 1002 (e.g., the second antenna 212 in FIG. 2), and the third antenna (e.g., the third antenna 213 of FIG. 2). For example, the electronic device

201 may be an electronic device having the structure described above with reference to FIG. 6 to FIG. 8*b*.

In operation 1051, the electronic device 201 may transmit first data to the external electronic device 204 using the first antenna 1001. For example, the electronic device 201 may transmit a first signal including the first data. The first signal may be a signal for polling of the external electronic device 204. The first data may include channel identification information. The first data may include information for timing synchronization between the external electronic device 204 and the electronic device 201.

In operation 1053, the electronic device 201 may receive a first response from the external electronic device 204 using the first antenna 1001 and the second antenna 1002. For example, the first response may include response time information. The response time information may include information about the time taken from when the external electronic device 204 receives the first data until it transmits the first response.

In operation 1055, the electronic device 201 may transmit second data to the external electronic device 204 using the first antenna 1001. For example, the electronic device 201 may transmit a second signal including the second data. The second signal may be a signal for polling of the external electronic device 204. The second data may include channel identification information. The second data may include information for timing synchronization between the external electronic device 204 and the electronic device 201.

In operation 1057, the electronic device 201 may receive a second response from the external electronic device 204 using the first antenna 1001 and the third antenna 1003. For example, the second response may include response time information. The response time information may include information about the time taken from when the external electronic device 204 receives the second data until it transmits the second response.

For example, the electronic device 201 may perform operation 1051 to operation 1057 according to the single sided-TWR (SS-TWR) of the UWB standard (e.g., the Institute of Electrical and Electronics Engineers (IEEE) 802.15.4a standard). For example, operation 1051 and operation 1053 may be referred to as a first positioning 1093. The electronic device 201 may perform the first positioning 1093 by receiving a signal from the external electronic device 204 using a plurality of antennas. It is to be understood that the first positioning 1093 simultaneously performs AoA measurement and ranging (e.g., SS-TWR) using the first antenna 1001 and the second antenna 1002. Operation 1055 and operation 1057 may be referred to as a second positioning 1094. The electronic device 201 may perform the second positioning 1094 by receiving a signal from the external electronic device 204 using a plurality of antennas. It is to be understood that the second positioning 1094 simultaneously performs AoA measurement and ranging (e.g., SS-TWR) using the first antenna 1001 and the third antenna 1003.

In operation 1059, the electronic device 201 may determine the position of the external electronic device 204 using the first response and the second response. For example, the electronic device 201 may determine the position of the external electronic device 204 based on a first phase difference between the first antenna 1001 and the second antenna 1002, which are associated with the reception of the first response, first response time information included in the first response, a second phase difference between the first antenna 1001 and the third antenna 1003, which are associated with the reception of the second response, and second response time information included in the second response. The electronic device 201 may determine the position of the external electronic device 204 based on candidate directions based on the first phase difference, the first distance based on the first response time information, candidate directions based on the second phase difference, and the second distance base on the second response time information.

Figure 10C:
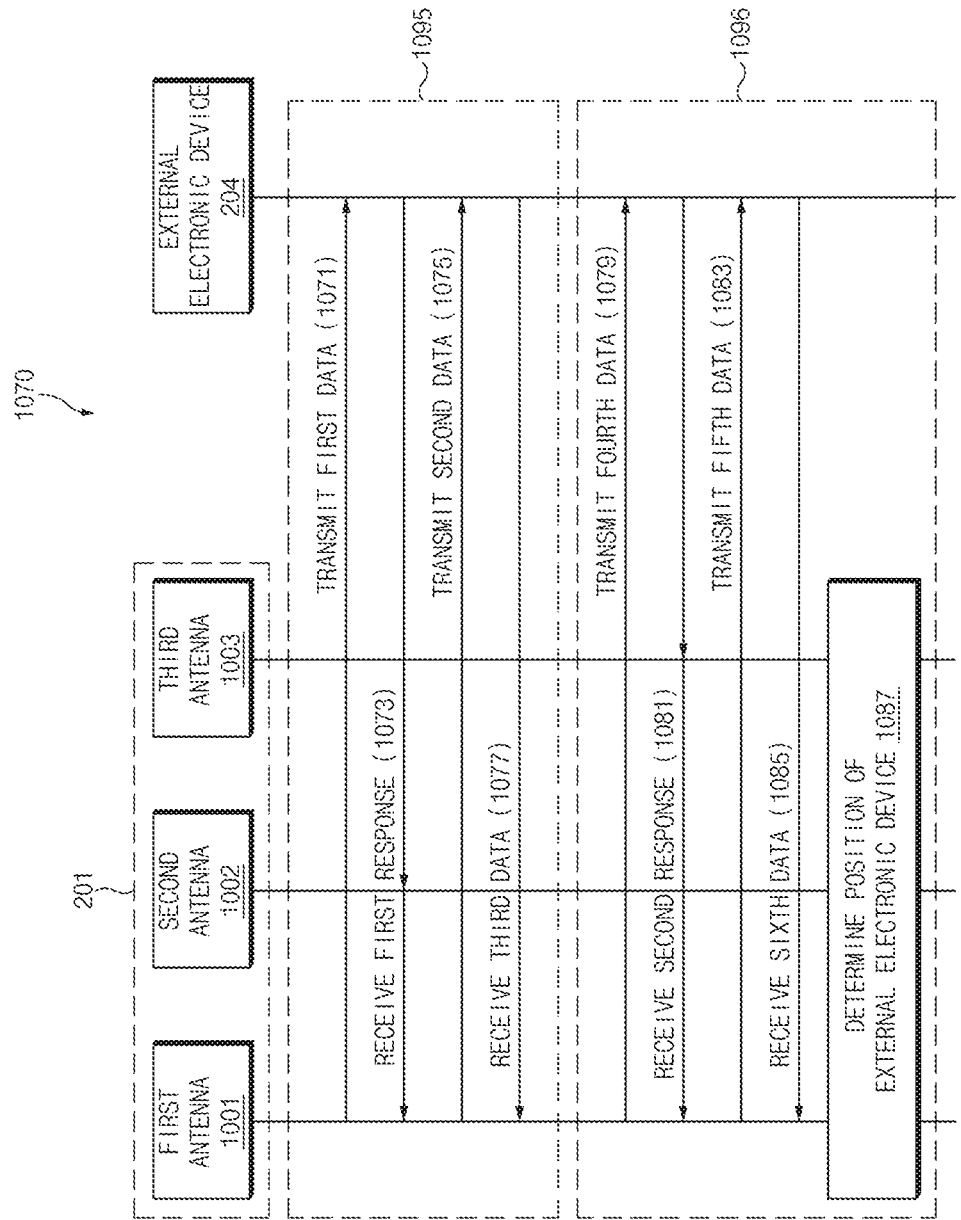
FIG. 10c illustrates a signal flow diagram of the position determination method according to an embodiment.

FIG. 10*c* illustrates a signal flow diagram 1070 of the position determination method according to an embodiment.

Referring to FIG. 10*c*, the electronic device 201 may include a first antenna 1001 (e.g., the first antenna 211 in FIG. 2) and a second antenna 1002 (e.g., the second antenna 212 in FIG. 2), and a third antenna (e.g., the third antenna 213 of FIG. 2). For example, the electronic device 201 may be an electronic device having the structure described above with reference to FIG. 6 to FIG. 8*b*.

In operation 1071, the electronic device 201 may transmit first data to the external electronic device 204 using the first antenna 1001. For example, the electronic device 201 may transmit a first signal including the first data. The first signal may be a signal for polling of the external electronic device 204. The first data may include channel identification information. The first data may include information for timing synchronization between the external electronic device 204 and the electronic device 201.

In operation 1073, the electronic device 201 may receive a first response from the external electronic device 204 using the first antenna 1001 and the second antenna 1002. For example, the first response may include response time information. The response time information may include information about the time taken from when the external electronic device 204 receives the first data until it transmits the first response.

In operation 1075, the electronic device 201 may transmit second data to the external electronic device 204. For example, the second data may include information about response time information (e.g., time taken to transmit the second data after receiving the first response). For example, the second data may include information about the distance between the electronic device 201 and the external electronic device 204, which is determined based on the transmission of the first data and the reception time of the first response.

In operation 1077, the electronic device 201 may receive third data from the external electronic device 204. For example, the third data may include information about response time information (e.g., time taken to transmit the third data after receiving the second data). For example, the third data may include information about the distance between the electronic device 201 and the external electronic device 204, which is determined by the external electronic device 204 based on the transmission of the first response and the reception time of the second data.

In operation 1079, the electronic device 201 may transmit fourth data to the external electronic device 204 using the first antenna 1001. For example, the electronic device 201 may transmit a fourth signal including the fourth data. The first signal may be a signal for polling of the external electronic device 204. The first data may include channel identification information. The first data may include information for timing synchronization between the external electronic device 204 and the electronic device 201.

In operation 1081, the electronic device 201 may receive a second response from the external electronic device 204 using the first antenna 1001 and the third antenna 1003. For example, the second response may include response time information. The response time information may include information about the time taken from when the external electronic device 204 receives the fourth data until it transmits the second response.

In operation 1083, the electronic device 201 may transmit fifth data to the external electronic device 204. For example, the fifth data may include information about response time information (e.g., time taken to transmit the fifth data after receiving the second response). For example, the second data may include information about the distance between the electronic device 201 and the external electronic device 204, which is determined based on the transmission of the fourth data and the reception time of the second response.

In operation 1085, the electronic device 201 may receive sixth data from the external electronic device 204. For example, the sixth data may include information about response time information (e.g., time taken to transmit the sixth data after receiving the fifth data). For example, the sixth data may include information about the distance between the electronic device 201 and the external electronic device 204, which is determined by the external electronic device 204 based on the transmission of the second response and the reception time of the fifth data.

For example, the electronic device 201 may perform operation 1071 to operation 1085 according to the double sided-TWR (DS-TWR) of the UWB standard (e.g., the Institute of Electrical and Electronics Engineers (IEEE) 802.15.4a standard). For example, operation 1071 to operation 1077 may be referred to as a first positioning 1095. The electronic device 201 may perform the first positioning 1095 by receiving a signal from the external electronic device 204 using a plurality of antennas. It is to be understood that the first positioning 1095 simultaneously performs AoA measurement and ranging (e.g., DS-TWR) using the first antenna 1001 and the second antenna 1002. Operation 1079 to operation 1085 may be referred to as a second positioning 1096. The electronic device 201 may perform the second positioning 1096 by receiving a signal from the external electronic device 204 using a plurality of antennas. It is to be understood that the second positioning 1096 simultaneously performs AoA measurement and ranging (e.g., DS-TWR) using the first antenna 1001 and the third antenna 1003.

In operation 1087, the electronic device 201 may determine the position of the external electronic device 204 using the first response and the second response. For example, the electronic device 201 may determine the position of the external electronic device 204 based on a first phase difference between the first antenna 1001 and the second antenna 1002, which are associated with the reception of the first response, first response time information included in the first response, a second phase difference between the first antenna 1001 and the third antenna 1003, which are associated with the reception of the second response, and second response time information included in the second response. The electronic device 201 may determine the position of the external electronic device 204 based on candidate directions based on the first phase difference, the first distance based on the first response time information, candidate directions based on the second phase difference, and the second distance base on the second response time information.

Figure 11:
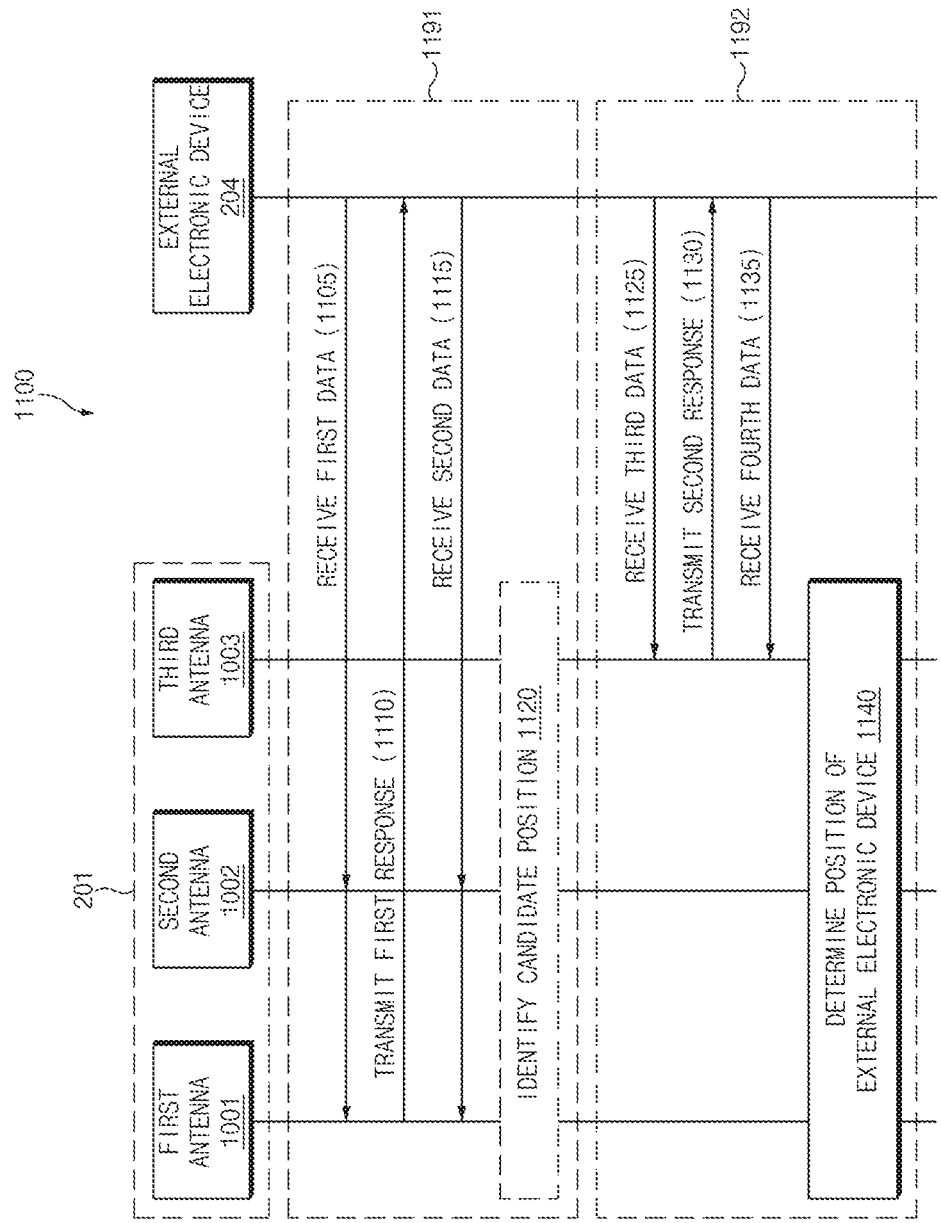
FIG. 11 illustrates a signal flow diagram of the position determination method according to an embodiment.

FIG. 11 illustrates a signal flow diagram 1100 of the position determination method according to an embodiment.

Referring to FIG. 11, the electronic device 201 may include the first antenna 1001 (e.g., the first antenna 211 in FIG. 3) and the second antenna 1002 (e.g., the second antenna 212 in FIG. 3), and the third antenna (e.g., the third antenna 213 of FIG. 3). For example, the electronic device 201 may be an electronic device having the structure described above with reference to FIG. 8b and FIG. 9.

In operation 1105, the electronic device 201 may receive first data from the external electronic device 204 using the first antenna 1001 and/or the second antenna 1002. The description of operation 1105 may be referred to by description of operation 1005 of FIG. 10a.

In operation 1110, the electronic device 201 may transmit a first response to the external electronic device 204 using the first antenna 1001. The description of operation 1110 may be referred to by description of operation 1010 of FIG. 10a.

In operation 1115, the electronic device 201 may receive second data from the external electronic device 204 using the first antenna 1001 and the second antenna 1002. The description of operation 1115 may be referred to by description of operation 1015 of FIG. 10a.

In operation 1120, the electronic device 201 may identify candidate positions of the external electronic device 204. The description of operation 1120 may be referred to by description of operation 1020 of FIG. 10a.

For example, operation 1105, operation 1110, operation 1115, and operation 1020 may be referred to as a first positioning 1191. The electronic device 201 may perform the first positioning 1191 by receiving a signal from the external electronic device 204 using a plurality of antennas. It is to be understood that the first positioning 1191 simultaneously performs AoA measurement and ranging (e.g., two way ranging (TWR)) using the first antenna 1001 and the second antenna 1002.

In operation 1125, the electronic device 201 may receive third data from the external electronic device 204 using the third antenna 1003. For example, the electronic device 201 may allow the third antenna 1003 to be connected to the communication processor by controlling a wireless communication circuit associated with the communication processor. For example, the electronic device 201 may receive the third signal including the third data. The third signal may be a signal for polling of the electronic device 201. For example, the third data may include transmission time information about the time when the external electronic device 204 transmits the third signal. The third data may include channel identification information. The third data may include information for timing synchronization between the external electronic device 204 and the electronic device 201.

In operation 1130, the electronic device 201 may transmit a second response to the external electronic device 204 using the third antenna 1003. For example, the electronic device 201 may include, in the second response, information (e.g., response time information) about the time when the second response is transmitted.

In step 1135, the electronic device 201 receives the fourth data from the external electronic device 204 using the third antenna 1003. The electronic device 201 may receive the fourth signal including the fourth data. The fourth data may include information about the time at which the external electronic device 204 transmits the fourth signal (e.g., response time information). The fourth data may further include a channel identifier, information about the time at which the external electronic device 204 transmits the third data, and/or information about the time at which the external electronic device 204 received the second response.

For example, the electronic device 201 may perform operation 1125, operation 1130, and operation 1135 according to the two way ranging (TWR) of the UWB standard.

In operation 1140, the electronic device 201 may determine the position of the external electronic device 204. For example, the electronic device 201 may identify the distance between the electronic device 201 and the external electronic device 204 using the fourth data received using the third antenna 1003 in operation 1135. The electronic device 201 may identify the distance between the electronic device 201 and the external electronic device 204 based on the ToF. For example, the electronic device 204 may determine one of the candidate positions identified in operation 1120 as the position of the external electronic device 204, based on the identified distance. For another example, the electronic device 204 may determine the position of the external electronic device 204 based on the direction and the distance based on the second data and the direction and the distance based on the fourth data.

For example, operation 1125, operation 1130, operation 1135, and operation 1240 may be referred to as a second positioning 1192. The electronic device 201 may perform the second positioning 1192 by receiving a signal from the external electronic device 204 using a single antenna. It is to be understood that the second positioning 1192 performs ranging (e.g., two way ranging (TWR)) using the third antenna 1003.

In the example of FIG. 11, the external electronic device 204 is illustrated to transmit a polling signal (e.g., first data and third data); however, embodiments of the present disclosure are not limited thereto. For example, the electronic device 201 may transmit a polling signal to the external electronic device 204. In this case, the transmitting and receiving ends of FIG. 11 may be changed with each other. For example, in operation 1105, the electronic device 201 may transmit the first data to the external electronic device 204 using the first antenna 1001 and/or the second antenna 1002. In this case, the electronic device 201 may receive the first response from the external electronic device 204 using the first antenna 1001 and the second antenna 1002. The first response may include information (e.g., response time information) about the time taken for the external electronic device 204 to transmit the first response after receiving the first data. The electronic device 201 may determine the distance between the electronic device 201 and the external electronic device 204 based on the transmission time of the first data, the reception time of the first response time, and the response time information. Furthermore, the electronic device 201 may acquire information about the phase difference between the first antenna 1001 and the second antenna 1002, which are associated with the reception of the first response. For positioning of the external electronic device 204, in operation 1115, the electronic device 201 may transmit the second data to the external electronic device 204. For example, in operation 1125, the electronic device 201 may transmit the third data (e.g., polling) to an external electronic device using the third antenna 1003. In operation 1130, the electronic device 201 may receive the second response using the third antenna 1003. The second response may include information (e.g., response time information) about the time taken for the external electronic device 204 to transmit the second response after receiving the third data. The electronic device 201 may determine the distance between the electronic device 201 and the external electronic device 204 based on the transmission time of the third data, the reception time of the second response time, and the response time information. For positioning of the external electronic device 204, in operation 1135, the electronic device 201 may transmit the fourth data to the external electronic device 204. In operation 1140, the electronic device 201 may determine the position of the external electronic device based on the phase difference associated with the reception of the first response, the time information associated with the first response, and the time information associated with the second response.

Figure 12:
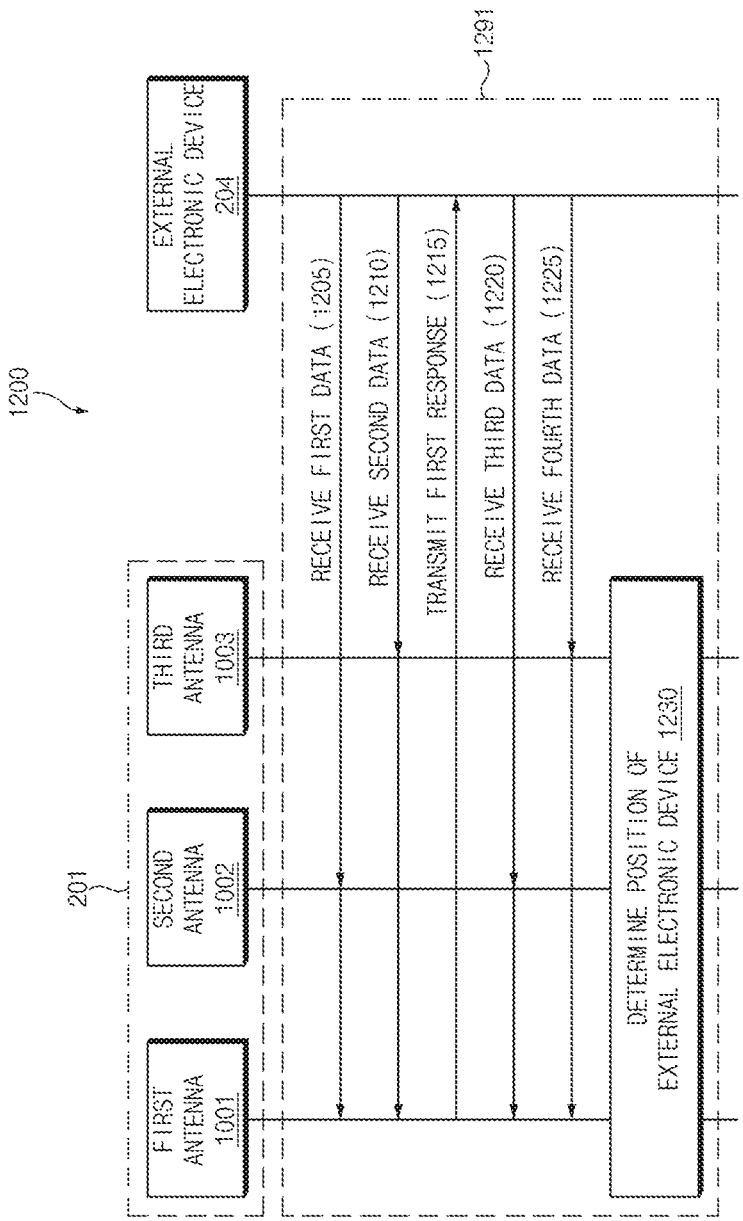
FIG. 12 illustrates a signal flow diagram of the position determination method according to an embodiment.

FIG. 12 illustrates a signal flow diagram 1200 of the position determination method according to an embodiment.

Referring to FIG. 12, the electronic device 201 may include the first antenna 1001 (e.g., the first antenna 211 in FIG. 2) and the second antenna 1002 (e.g., the second antenna 212 in FIG. 2), and the third antenna (e.g., the third antenna 213 of FIG. 2). For example, the electronic device 201 may be an electronic device having the structure described above with reference to FIG. 6 to FIG. 8b.

In operation 1205, the electronic device 201 may receive first data from the external electronic device 204 using the first antenna 1001 and/or the second antenna 1002. For example, the first data may include transmission time information about the time when the external electronic device 204 transmits the first data.

In operation 1210, the electronic device 201 may receive second data from the external electronic device 204 using the first antenna 1001 and/or the third antenna 1003. For example, the second data may include transmission time information about the time when the external electronic device 204 transmits the second data.

According to an embodiment, the first data and the second data may be included in the first signal. For example, the first data and the second data may be data included in one packet. The electronic device 201 may receive the first data using the first antenna 1001 and the second antenna 1002, change the communication circuit setting using a guard interval between the first data and the second data, and receive the second data using the first antenna 1001 and the third antenna 1003. The first signal may be a signal for polling of the electronic device 201. For example, the first data may include channel identification information and/or information for timing synchronization between the external electronic device 204 and the electronic device 201.

In operation 1215, the electronic device 201 may transmit a first response to the external electronic device 204 using the first antenna 1001. For example, the electronic device 201 may include, in the first response, information (e.g., time stamp) about the time when the first response is transmitted.

In operation 1220, the electronic device 201 may receive third data from the external electronic device 204 using the first antenna 1001 and the second antenna 1002. The third data may include information about the time when the external electronic device 204 transmits the third data.

In operation 1225, the electronic device 201 may receive fourth data from the external electronic device 204 using the first antenna 1001 and the third antenna 1003. The fourth data may include information about the time when the external electronic device 204 transmits the fourth data.

According to an embodiment, the third data and the fourth data may be included in the second signal. For example, the third data and the fourth data may be data included in one packet. The electronic device 201 may receive the third data using the first antenna 1001 and the second antenna 1002, change the communication circuit setting using a guard interval between the third data and the fourth data, and receive the fourth data using the first antenna 1001 and the third antenna 1003.

For example, the electronic device 201 may perform operation 1205, operation 1210, operation 1215, operation 1220, and operation 1225 according to the two way ranging (TWR) of the UWB standard (e.g., the Institute of Electrical and Electronics Engineers (IEEE) 802.15.4a standard).

In operation 1230, the electronic device 201 may determine the position of the external electronic device 204. For example, the electronic device 201 may identify candidate positions of the external electronic device 204 based on the phase difference of the second signal received by the first antenna 1001 and the second antenna 1002, and the distance between the electronic device 201 and the external electronic device 204 which is identified based on the second data. The electronic device 201 may determine one of the candidate positions as the position of the external electronic device 204 based on the phase difference of the second signal received by the first antenna 1001 and the third antenna 1003, and the distance between the electronic device 201 and the external electronic device 204 which is identified based on the fourth data. For another example, the electronic device 201 may determine the position of the external electronic device 204 based on a) the phase difference of the second signal received by the first antenna 1001 and the second antenna 1002 and the distance between the electronic device 201 and the external electronic device 204 which is identified based on the second data, and b) the phase difference of the second signal received by the first antenna 1001 and the third antenna 1003 and the distance between the electronic device 201 and the external electronic device 204 which is identified based on the fourth data.

For example, operation 1205, operation 1210, operation 1215, operation 1220, operation 1225, and operation 1230 of FIG. 12 may be referred to as a first positioning 1291. In the example of FIG. 12, the electronic device 201 may determine the position of the external electronic device 204 with only one positioning by receiving a packet (e.g., a second packet 1492 of FIG. 14) including a plurality of pieces of time information. It is to be understood that the first positioning 1291 simultaneously performs AoA measurement and ranging using the first antenna 1001 and the second antenna 1002 and using the first antenna 1001 and the third antenna 1003.

In the example of FIG. 12, as described above with reference to FIG. 10a, the transmitting end and the receiving end may be changed.

Figure 13:
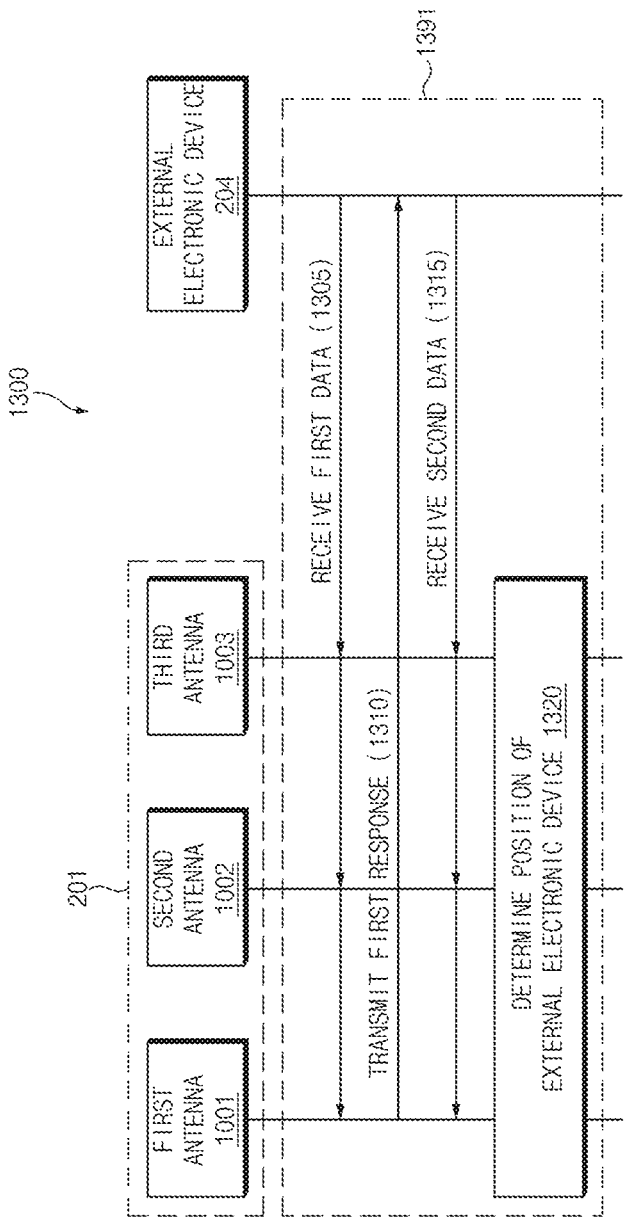
FIG. 13 illustrates a signal flow diagram of the position determination method according to an embodiment.

FIG. 13 illustrates a signal flow diagram 1300 of the position determination method according to an embodiment.

Referring to FIG. 13, the electronic device 201 may include a first antenna 1001 (e.g., the first antenna 211 of FIG. 4) and a second antenna 1002 (e.g., the second antenna 212 of FIG. 4), and a third antenna (e.g., the third antenna 213 of FIG. 4).

In operation 1305, the electronic device 201 may receive first data from the external electronic device 204 using each of the first antenna 1001, the second antenna 1002, and the third antenna 1003. For example, the electronic device 201 may receive a first signal including the first data. The first signal may be a signal for polling of the electronic device 201. For example, the first data may include transmission time information about the time when the external electronic device 204 transmits the first signal. The first data may include channel identification information. The first data may include information for timing synchronization between the external electronic device 204 and the electronic device 201.

In operation 1310, the electronic device 201 may transmit a first response to the external electronic device 204 using the first antenna 1001. For example, the electronic device 201 may include, in the first response, information (e.g., time stamp) about the time when the first response is transmitted.

In operation 1315, the electronic device 201 may receive second data from the external electronic device 204 using each of the first antenna 1001, the second antenna 1002, and the third antenna 1003. For example, the electronic device 201 may receive the second signal including the second data. The second data may include information about the time when the external electronic device 204 transmits the second signal. The second data may further include, for example, a channel identifier, information about the time when the external electronic device 204 transmits the first data, and/or information about the time when the external electronic device 204 receives the first response.

In operation 1320, the electronic device 201 may determine the position of the external electronic device 204. For example, the electronic device 201 may determine the position of the external electronic device 204 based on a first distance between the first antenna 1001 and the external electronic device 204, a second distance between the second antenna 1002 and the external electronic device 204, and a third distance between the third antenna 1003 and the external electronic device 204. For example, the electronic device 201 may determine the position of the external electronic device 204 by performing triangulation using the physical arrangement of the first antenna 1001, the second antenna 1002, and the third antenna 1003, the first distance, the second distance, and the third distance.

For example, it is to be understood that a positioning 1391 of FIG. 13 is the measurement of the position of the external electronic device 204 using three or more antennas of the electronic device 201 through distance measurement (e.g., TWR) for each antenna. FIG. 13 illustrates that only one ranging is performed; however, embodiments of the present disclosure are not limited thereto. For example, the electronic device 201 may perform the first ranging with the external electronic device 204 using the first antenna 1001, may perform the second ranging with the external electronic device 204 using the second antenna 1002, and may perform the third ranging with the external electronic device 204 using the third antenna 1003.

In the example of FIG. 13, the transmitting end and the receiving end may be changed. For example, in operation 1305, the electronic device 201 may transmit first data (e.g., data for polling) to the external electronic device 204 using the first antenna 1001, the second antenna 1002, and/or the third antenna 1003. In operation 1310, the electronic device 201 may receive a first response from the external electronic device 204 using the first antenna 1001, the second antenna 1002, and the third antenna 1003. For example, using response time information included in the first response, the electronic device 201 may determine the position of the external electronic device 204.

Figure 14:
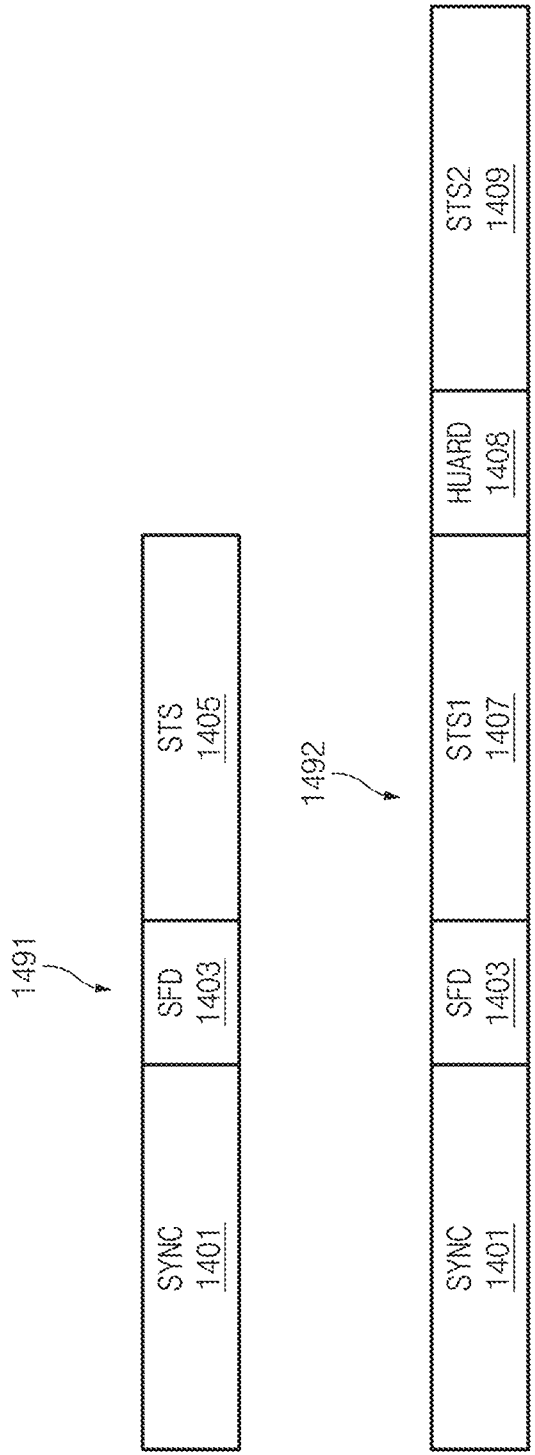
FIG. 14 illustrates packet structures according to various embodiments.

FIG. 14 illustrates a diagram packet structures according to various embodiments.

According to an embodiment, the electronic device 201 may receive a packet having the same structure as a first packet 1491 from the external electronic device 204. For example, the first packet 1491 may include a synchronization field (SYNC) 1401, a start of frame delimiter (SFD) 1403, and a scrambled time stamp (STS) 1405.

For example, the SYNC 1401 may include information for channel identification and packet synchronization. For example, the electronic device 201 may search for a path between the electronic device 201 and the external electronic device 204 using a correlation channel impulse response (CIR) of the SYNC 1401 of data received from the external electronic device 204. For example, the SFD 1403 indicates the end of SYNC 1401, and may be used as a reference for generating time stamp information of the STS 1405. For example, the STS 1405 may include time stamp information. For example, the time stamp information may include response time information. The STS 1405 may be encoded using, for example, a code defined between the transmitting end and the receiving end. For example, in the embodiments of FIG. 10*a* and FIG. 11, the first data or the second data may be transmitted from the external electronic device 204 to the electronic device 201 using the first packet 1491.

According to an embodiment, the electronic device 201 may receive a packet having the same structure as the second packet 1492 from the external electronic device 204. For example, the second packet 1492 may include a SYNC 1401, an SFD 1403, a first STS 1407, a guard 1408, and a second STS 1409. For example, the guard 1408 may be used as a delimiter between the first STS 1407 and the second STS 1409.

For example, the first STS 1407 may include first time stamp information (e.g., response time information), and the second STS may include second time stamp information (e.g., response time information). For example, the first time stamp and the second time stamp may be information about the same time based on the SFD 1403. For another example, the first time stamp and the second time stamp may be information about different times from each other. For example, in the example of FIG. 12, the first data may correspond to the first STS 1407 and the second data may correspond to the second STS 1409. For another example, the third data in FIG. 12 may correspond to the first STS 1407 and the fourth data may correspond to the second STS 1409.

Figure 15:
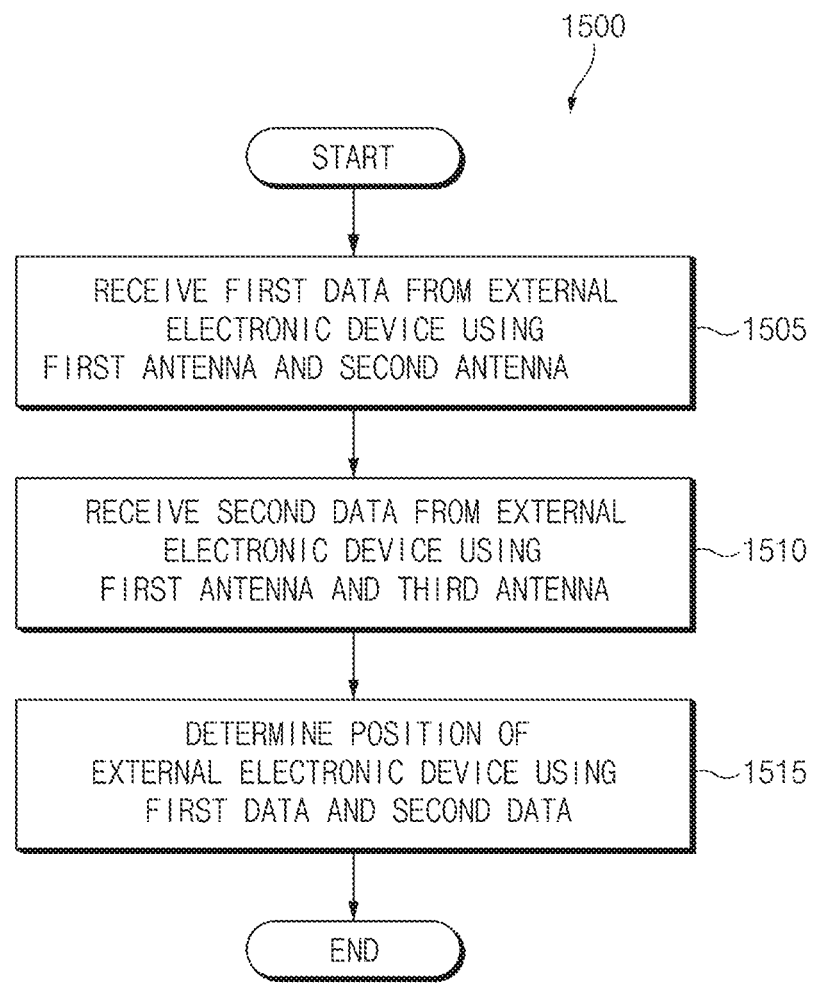
FIG. 15 illustrates a flow chart of the position determination method according to an embodiment.

FIG. 15 illustrates a flow chart 1500 of the position determination method according to an embodiment.

According to various embodiments, a portable electronic device (e.g., the electronic device 201 of FIG. 2) may include a communication circuit (e.g., the first communication circuit 661 and the second communication circuit 662 of FIG. 6 to FIG. 8*b*) electrically connected to a first antenna (e.g., the first antenna 211 of FIG. 2), and electrically connected to a second antenna (e.g., the second antenna 212 of FIG. 2) or a third antenna (e.g., the third antenna 213 of FIG. 2). The portable electronic device may include at least one processor (e.g., the processor 620 and the first communication processor 691 of FIG. 6 to FIG. 8*b*) operatively connected to the communication circuit and a memory (e.g., the memory 630 of FIG. 6 to FIG. 8*b*) operatively connected to the at least one processor. For example, the memory may store one or more instructions that, when executed, cause at least one processor to perform operations to be described below.

In operation 1505, the at least one processor may receive first data from the external electronic device using the first antenna and the second antenna. The first data may include time information (e.g., response time information) regarding the first data transmission time of the external electronic device. For example, operation 1505 may correspond to operation 1015 of FIG. 10*a*.

In operation 1510, the at least one processor may receive second data from the external electronic device using the first antenna and the third antenna. The second data may include time information (e.g., response time information) regarding the second data transmission time of the external electronic device. For example, operation 1510 may correspond to operation 1035 of FIG. 10*a*.

In operation 1515, the at least one processor may determine the position of the external electronic device using the first data and the second data. The at least one processor may determine the position of the external electronic device based on the phase difference associated with reception of the first data, time information of the first data, the phase difference associated with reception of the second data, and time information of the second data. For example, the at least one processor may determine the position of the external electronic device based on first directions based on the phase difference associated with the first data, the first distance based on the time information of the first data, second directions based on the phase difference associated with reception of the second data, and the second distance based on the time information of the second data. For example, operation 1515 may correspond to operation 1040 of FIG. 10*a*.

Figure 16:
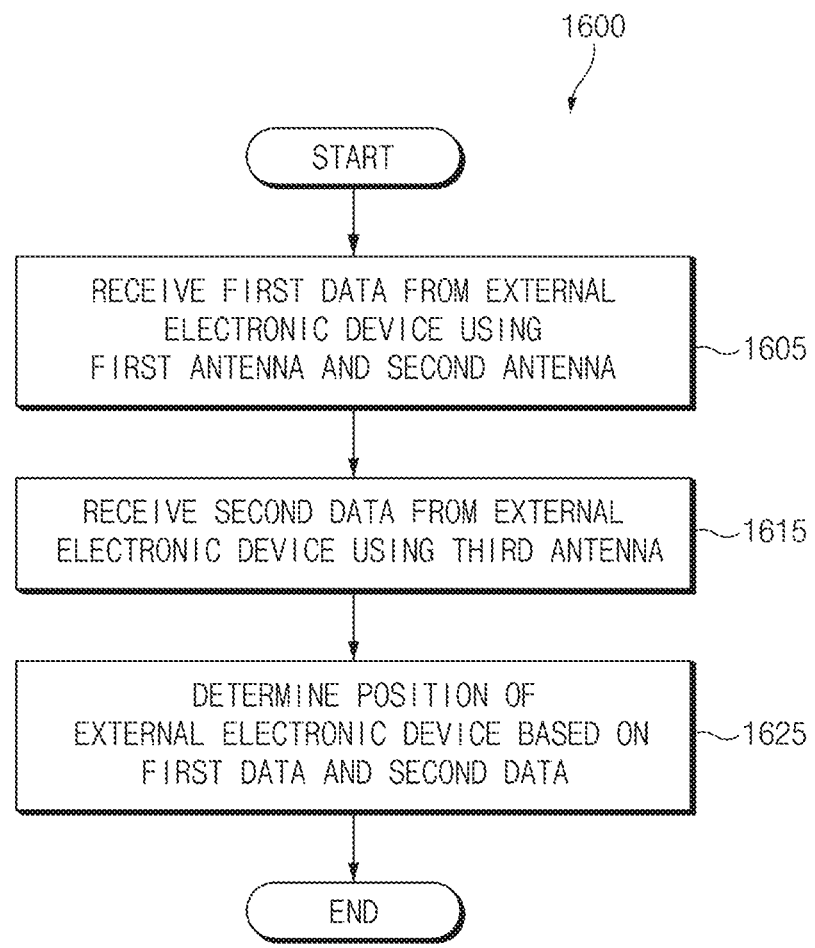
FIG. 16 illustrates a flow chart of the position determination method according to an embodiment.

FIG. 16 illustrates a flow chart 1600 of the position determination method according to an embodiment.

According to various embodiments, a portable electronic device (e.g., the electronic device 201 of FIG. 3) may include a communication circuit (e.g., the first communication circuit 661 of FIG. 9) electrically connected to a first antenna (e.g., the first antenna 211 of FIG. 3) or a third antenna (e.g., the third antenna 213 of FIG. 3), and electrically connected to a second antenna (e.g., the second antenna 212 of FIG. 3). The portable electronic device may include at least one processor (e.g., the processor 620 and the first communication processor 691 of FIG. 8*b* and FIG. 9) operatively connected to the communication circuit and a memory (e.g., the memory 630 of FIG. 8*b* and FIG. 9) operatively connected to the at least one processor. For example, the memory may store one or more instructions that, when executed, cause at least one processor to perform operations to be described below.

In operation 1605, the at least one processor may receive first data from the external electronic device using the first antenna and the second antenna. The first data may include time information (e.g., response time information) regarding the first data transmission time of the external electronic device. For example, operation 1605 may correspond to operation 1115 of FIG. 11.

In operation 1615, the at least one processor may receive second data from the external electronic device using the third antenna. The second data may include time information (e.g., response time information) regarding the second data transmission time of the external electronic device. For example, operation 1615 may correspond to operation 1135 of FIG. 11.

In operation 1625, the at least one processor may determine the position of the external electronic device based on the first data and the second data. For example, the at least one processor may determine the position of the external electronic device based on the phase difference associated with reception of the first data, time information of the first data, and time information of the second data. The at least one processor may determine the position of the external electronic device based on directions based on the phase difference associated with reception of the first data, the distance based on the time information of the first data, and the distance based on the time information of the second data.

For example, the operation 1625 may correspond to operation 1140 of FIG. 11.

According to various embodiments, a portable electronic device (e.g., the electronic device 201 of FIG. 3) may include a communication circuit (e.g., the first communication circuit 661 and/or the second communication circuit 662 of FIG. 8b and FIG. 9) electrically connected to a first antenna (e.g., the first antenna 211 of FIG. 3) or a third antenna (e.g., the third antenna 213 of FIG. 3) and electrically connected to a second antenna (e.g., the second antenna 212 of FIG. 3), at least one processor (e.g., the first communication processor 691 and/or the processor 620 of FIG. 8b and FIG. 9) operatively connected to the communication circuit, and a memory (e.g., the memory 630 of FIG. 8b and FIG. 9) operatively connected with the at least one processor. The memory may include one or more instructions that, when executed, cause the at least one processor to perform operations to be described below.

For example, the one or more instructions may, when executed, cause the at least one processor to receive a first signal including first data from an external electronic device using the first antenna and the second antenna, receive a second signal including second data from the external electronic device using the third antenna, and determine a position of the external electronic device based on a phase difference of the first signal, time information of the first data, and time information of the second data. For example, the first antenna and the second antenna may be located within a first distance to perform beamforming on the first signal, and the third antenna may be spaced apart from the first antenna or the second antenna by a second distance or more, and the second distance may be longer than the first distance. At least one of the first antenna, the second antenna, and the third antenna may not be located on a same straight line, and the specified distance may be set based on a resolution of positioning using the first signal.

According to an embodiment, the one or more instructions may, when executed, cause the at least one processor to identify a plurality of candidate directions of the external electronic device based on a phase difference of the first signal, and identify a third distance between the portable electronic device and the external electronic device based on time information of the first data. The one or more instructions may, when executed, cause the at least one processor to identify a fourth distance between the third antenna and the external electronic device based on the time information of the second data, and determine the position of the external electronic device based on the plurality of candidate directions, the third distance, and the fourth distance.

According to an embodiment, the one or more instructions may, when executed, cause the at least one processor to transmit a third signal to the external electronic device using the first antenna, receive the first signal including the first data from the external electronic device in response to the third signal, transmit a fourth signal to the external electronic device using the third antenna, and receive the second signal including the second data from the external electronic device in response to the fourth signal. For example, the time information of the first data may include response time information taken for the external electronic device to transmit the first signal after receiving the third signal, and the time information of the second data may include response time information taken for the external electronic device to transmit the second signal after receiving the fourth signal.

For example, the at least one processor may include a first communication processor (e.g., the first communication processor 691 of FIG. 8b) configured to provide communication based on a first communication protocol and a second communication processor (e.g., the second communication processor 692 of FIG. 8b) configured to provide communication based on a second communication protocol. The communication circuit may include a switching circuit to connect the third antenna to the first communication processor or the second communication processor.

According to an embodiment of the present disclosure, a method of determining a position of an external electronic device by a portable electronic device may include receiving a first signal including first data from the external electronic device using a first antenna and a second antenna connected to a communication circuit of the portable electronic device, switching the connection of the first antenna such that the communication circuit is connected to the third antenna, receiving a second signal including second data from the external electronic device using the third antenna, and determining the position of the external electronic device based on a phase difference of the first signal, time information of the first data, and time information of the second data. The communication circuit may be electrically connected to the first antenna or the third antenna and electrically connected to the second antenna. For example, the first antenna and the second antenna may be located within a first distance, and the third antenna may be spaced apart from the first antenna or the second antenna by a second distance or more, and the second distance may be longer than the first distance. For example, at least one of the first antenna, the second antenna, and the third antenna may not be located on a same straight line, and the specified distance may be set based on a resolution of positioning using the first signal.

The determining of the position of the external electronic device may include identifying a plurality of candidate directions of the external electronic device based on a phase difference of the first signal, identifying a third distance between the portable electronic device and the external electronic device based on the time information of the first data, identifying a fourth distance between the third antenna and the external electronic device based on the time information of the second data, and determining the position of the external electronic device based on the plurality of candidate directions, the third distance, and the fourth distance.

The receiving of the first signal may include transmitting a third signal to the external electronic device using the first antenna and receiving the first signal including the first data from the external electronic device in response to the third signal, and the receiving of the second signal may include transmitting a fourth signal to the external electronic device using the third antenna and receiving the second signal including the second data from the external electronic device in response to the fourth signal.

For example, the portable electronic device may include a first communication processor configured to provide communication based on the first communication protocol and a second communication processor configured to provide communication based on the second communication protocol. The transmitting of the fourth signal may include disconnecting the first antenna from the first communication processor, and connecting the third antenna to the first communication processor.

For example, the first communication protocol may include a communication protocol using an ultra-wideband signal, and the second communication protocol may be Bluetooth or Wi-Fi.

According to various embodiments, a portable electronic device may include a communication circuit (e.g., the first communication circuit 661 and/or the second communication circuit 662 of FIG. 6 to FIG. 8*b*) electrically connected to a first antenna (e.g., the first antenna 211 of FIG. 2) and electrically connected to a second antenna (e.g., the second antenna 212 of FIG. 2) or a third antenna (e.g., the third antenna 213 of FIG. 2), at least one processor (e.g., the first communication processor 691, the second communication processor 692, and/or the processor 620 of FIG. 6 to FIG. 8*b*) operatively connected with the communication circuit, and a memory (e.g., the memory 630 of FIG. 6 to FIG. 8*b*) operatively connected with the at least one processor. The memory may store one or more instructions that, when executed, cause the at least one processor to perform operations to be described below.

The one or more instructions may, when executed, cause the at least one processor to receive a first signal including first data from an external electronic device using the first antenna and the second antenna, receive a second signal including second data from the external electronic device using the first antenna and the second antenna, and determine a position of the external electronic device based on a phase difference of the first signal, time information of the first data, a phase difference of the second signal, and time information of the second data.

For example, the first antenna and the second antenna may be located within a first distance for beamforming, the first antenna and the third antenna may be located within the first distance for beamforming, and at least one of the first antenna, the second antenna, and the third antenna may not be located on a same straight line.

The one or more instructions may, when executed, cause the at least one processor to identify a plurality of candidate directions of the external electronic device based on a phase difference of the first signal, and identify a distance between the portable electronic device and the external electronic device based on time information of the first data.

The one or more instructions may, when executed, cause the at least one processor to identify a plurality of candidate directions of the external electronic device based on a phase difference of the second signal, and identify a distance between the portable electronic device and the external electronic device based on time information of the second data.

The at least one processor may include a first communication processor configured to provide communication based on a first communication protocol and a second communication processor configured to provide communication based on a second communication protocol. The communication circuit may include a switching circuit configured to connect the third antenna to the first communication processor or the second communication processor.

According to an embodiment, an electronic device may include communication means for receiving a first signal including first data from an external electronic device using signal transmitting and receiving means including a first antenna and a second antenna. The electronic device may include switching means for switching connection of the first antenna such that the communication means is connected to a third antenna of the signal transmitting and receiving means. The communication means may receive a second signal including the second data from the external electronic device using the third antenna. The electronic device may include position determination means for determining the position of the external electronic device based on a phase difference of the first signal, time information of the first data, and time information of the second data. The communication means may be electrically connected to the first antenna or the third antenna and electrically connected to the second antenna. For example, the first antenna and the second antenna may be located within a first distance, and the third antenna may be spaced apart from the first antenna or the second antenna by a second distance or more, and the second distance may be longer than the first distance. For example, at least one of the first antenna, the second antenna, and the third antenna may not be located on a same straight line, and the specified distance may be set based on a resolution of positioning using the first signal.

The position determination means may perform an operation of identifying a plurality of candidate directions of the external electronic device based on a phase difference of the first signal, an operation of identifying a third distance between the portable electronic device and the external electronic device based on the time information of the first data, an operation of identifying a fourth distance between the third antenna and the external electronic device based on the time information of the second data, and an operation of determining the position of the external electronic device based on the plurality of candidate directions, the third distance, and the fourth distance.

For reception of the first signal, the communication means may perform an operation of transmitting a third signal to the external electronic device using the first antenna and an operation of receiving the first signal including the first data from the external electronic device in response to the third signal. The operation of receiving the second signal may include an operation of transmitting a fourth signal to the external electronic device using the third antenna, and an operation of receiving the second signal including the second data from the external electronic device in response to the fourth signal.

For example, the communication means may include a first communication processor configured to provide communication based on the first communication protocol and a second communication processor configured to provide communication based on the second communication protocol. For example, the first communication protocol may include a communication protocol using an ultra-wideband signal, and the second communication protocol may be Bluetooth or Wi-Fi.

The switching means may disconnect the first antenna from the first communication processor and connect the third antenna to the first communication processor in order to transmit the fourth signal.

The invention claimed is:

1. A portable electronic device, comprising:
   a communication circuit electrically connected to a first antenna or a third antenna and electrically connected to a second antenna;
   a processor operatively connected with the communication circuit; and
   a memory operatively connected with the processor,
   wherein the memory stores instructions that, when executed, cause the processor to:
      receive, from an external electronic device, a first signal including first data using the first antenna and the second antenna,
      receive, from the external electronic device, a second signal including second data using the third antenna, and
      determine a position of the external electronic device based on a phase difference of the first signal, time information of the first data, and time information of the second data.

2. The portable electronic device of claim 1, wherein the first antenna and the second antenna are located within a first distance of each other for performing beamforming on the first signal,
wherein the third antenna is spaced apart from the first antenna or the second antenna by a second distance, and
wherein the second distance is longer than the first distance.

3. The portable electronic device of claim 2, wherein at least one of the first antenna, the second antenna, and the third antenna is not located on a same straight line, and
wherein the second distance is based on a resolution of positioning using the first signal.

4. The portable electronic device of claim 1, wherein the instructions, when executed, further cause the processor to:
identify a plurality of candidate directions of the external electronic device based on a phase difference of the first signal, and
identify a third distance between the portable electronic device and the external electronic device based on the time information of the first data.

5. The portable electronic device of claim 4, wherein the instructions, when executed, further cause the processor to:
identify a fourth distance between the third antenna and the external electronic device based on the time information of the second data, and
determine the position of the external electronic device based on the plurality of candidate directions, the third distance, and the fourth distance.

6. The portable electronic device of claim 1, wherein the instructions, when executed, further cause the processor to:
transmit a third signal to the external electronic device using the first antenna,
receive the first signal including the first data from the external electronic device in response to the third signal,
transmit a fourth signal to the external electronic device using the third antenna, and
receive the second signal including the second data from the external electronic device in response to the fourth signal.

7. The portable electronic device of claim 6, wherein the time information of the first data includes response time information indicating a time taken by the external electronic device to transmit the first signal, after receiving the third signal, and
wherein the time information of the second data includes response time information indicating a time taken by the external electronic device to transmit the second signal, after receiving the fourth signal.

8. The portable electronic device of claim 1, wherein the processor includes a first communication processor configured to provide communication based on a first communication protocol and a second communication processor configured to provide communication based on a second communication protocol,
wherein the communication circuit includes a switching circuit configured to connect the third antenna to the first communication processor or the second communication processor, and
wherein the first communication protocol uses an ultra-wideband signal.

9. A method of determining a position of an external electronic device by a portable electronic device, the method comprising:
receiving, from the external electronic device, a first signal including first data using a first antenna and a second antenna connected to a communication circuit of the portable electronic device;
switching the connection of the communication circuit from the first antenna to a third antenna;
receiving, from the external electronic device, a second signal including second data using the third antenna; and
determining a position of the external electronic device based on a phase difference of the first signal, time information of the first data, and time information of the second data.

10. The method of claim 9, wherein the first antenna and the second antenna are located within a first distance of each other, and
wherein the third antenna is spaced apart from the first antenna or the second antenna by a second distance, and
wherein the second distance is longer than the first distance.

11. The method of claim 10, wherein at least one of the first antenna, the second antenna, and the third antenna is not located on a same straight line, and
wherein the second distance is based on a resolution of positioning using the first signal.

12. The method of claim 9, wherein determining the position of the external electronic device comprises:
identifying a plurality of candidate directions of the external electronic device based on the phase difference of the first signal;
identifying a third distance between the portable electronic device and the external electronic device based on the time information of the first data;
identifying a fourth distance between the third antenna and the external electronic device based on the time information of the second data; and
determining the position of the external electronic device based on the candidate directions, the third distance, and the fourth distance.

13. The method of claim 9, wherein receiving the first signal comprises:
transmitting a third signal to the external electronic device using the first antenna; and
receiving, from the external electronic device, the first signal including the first data, in response to the third signal, and
wherein receiving the second signal comprises:
transmitting a fourth signal to the external electronic device using the third antenna; and
receiving, from the external electronic device, the second signal including the second data, in response to the fourth signal.

14. The method of claim 13, wherein the portable electronic device includes a first communication processor configured to provide communication based on a first communication protocol and a second communication processor configured to provide communication based on a second communication protocol, and
wherein transmitting the fourth signal comprises disconnecting the first antenna from the first communication processor and connecting the third antenna to the first communication processor.

15. The method of claim 14, wherein the first communication protocol uses an ultra-wideband signal, and
wherein the second communication protocol is Bluetooth or Wi-Fi.

16. A portable electronic device, comprising:
- a communication circuit electrically connected to a first antenna and electrically connected to a second antenna or a third antenna;
- a processor operatively connected with the communication circuit and including a first communication processor configured to provide communication based on a first communication protocol and a second communication processor configured to provide communication based on a second communication protocol; and
- a memory operatively connected with the processor,
- wherein the memory stores instructions that, when executed, cause the processor to:
  - receive, from an external electronic device, a first signal including first data using the first antenna and the second antenna;
  - receive, from the external electronic device, a second signal including second data using the first antenna and the second antenna; and
  - determine a position of the external electronic device based on a phase difference of the first signal, time information of the first data, a phase difference of the second signal, and time information of the second data, and
- wherein the communication circuit includes a switching circuit configured to connect the third antenna to the first communication processor or the second communication processor.

17. The portable electronic device of claim 16, wherein the first antenna and the second antenna are located within a first distance of each other for beamforming,
- wherein the first antenna and the third antenna are located within the first distance for beamforming, and
- wherein at least one of the first antenna, the second antenna, and the third antenna is not located on a same straight line.

18. The portable electronic device of claim 16, wherein the instructions, when executed, further cause the processor to:
- identify a plurality of candidate directions of the external electronic device based on a phase difference of the first signal, and
- identify a distance between the portable electronic device and the external electronic device based on the time information of the first data.

19. The portable electronic device of claim 18, wherein the instructions, when executed, further cause the processor to:
- identify a plurality of candidate directions of the external electronic device based on a phase difference of the second signal; and
- identify the distance between the portable electronic device and the external electronic device based on the time information of the second data.

* * * * *